United States Patent [19]

Claessen et al.

[11] Patent Number: 4,610,010
[45] Date of Patent: Sep. 2, 1986

[54] CONTROL CIRCUIT FOR AN ADAPTIVE HYBRID CONTROL IN A LOCAL AREA NETWORK

[75] Inventors: Albertus M. G. Claessen, Montfoort; Hendrik van Bokhorst, Nijkerk, both of Netherlands

[73] Assignee: NCR Corporation, Dayton, Ohio

[21] Appl. No.: 680,104

[22] Filed: Dec. 10, 1984

[51] Int. Cl.⁴ .......................... H04L 5/14; H04J 3/02; H04B 3/20
[52] U.S. Cl. ....................................... 370/32; 370/85; 179/170.8
[58] Field of Search ....................... 370/85, 60, 94, 32, 370/6; 340/825.5, 825.51; 179/170 NC, 170.8, 170.2

[56] References Cited

U.S. PATENT DOCUMENTS

| | | | |
|---|---|---|---|
| 4,292,623 | 9/1981 | Eswaran et al. | 340/825.5 |
| 4,380,761 | 4/1983 | Boggs | 370/85 |
| 4,549,048 | 10/1985 | Combler | 179/170.8 |
| 4,564,838 | 1/1986 | Boulogne et al. | 340/825.51 |

OTHER PUBLICATIONS

Patent abstracts of Japan, vol. 7, No. 8, (E-152) (1153), 13 Jan. 13, 1983.
National Telecommunications Conference, 30 Nov. to 4 Dec. 1980, IEEE New York, "Random Access Packet Switches Local Computer Network with Priority Function," pp. 37.4.1–37.4.6.

Primary Examiner—Douglas W. Olms
Assistant Examiner—Frank M. Scutch, III
Attorney, Agent, or Firm—Wilbert Hawk, Jr.; Albert L. Sessler, Jr.

[57] ABSTRACT

In a local area network having a plurality of stations coupled to a transmission line over which signals are being simultaneously transmitted and received and wherein each station includes a station controller, a transmitter, a receiver and an adaptive hybrid circuit coupled to the transmission line and between the transmitter and the receiver for adaptively cancelling crosstalk from the transmitter to the receiver, a control circuit in each station for controlling the operation of the adaptive hybrid circuit in the station. In a first embodiment of the invention the control circuit includes a first circuit responsive to a request-to-send signal from the station controller for generating a first signal to enable a signal to be transmitted by the transmitter, and a second circuit responsive to the first signal for enabling the adaptive hybrid circuit to adaptively cancel crosstalk from the transmitter to the receiver after a preselected period of time after the start of each transmission.

15 Claims, 10 Drawing Figures 4,610,010

CONTROL CIRCUIT FOR AN ADAPTIVE HYBRID CONTROL IN A LOCAL AREA NETWORK

CROSS REFERENCE TO RELATED PATENT APPLICATION

The commonly assigned U.S. patent application Ser. No. 623,302, filed June 22, 1984, for Adaptive Hybrid Circuit, inventor: Albertus M. G. Claessen, is related to this application.

BACKGROUND OF THE INVENTION

1. Field of the Invention

The present invention relates to an adaptive hybrid circuit for minimizing crosstalk from a transmitter to a receiver in the transceiver of a station when the transmitter and receiver are coupled to a two-wire transmission line or communication channel of a local area network comprised of a plurality of stations coupled to the same two-wire communication channel and, more particularly, to a control circuit for improving the operational capabilities of the adaptive hybrid circuit.

2. Description of the Prior Art

In the transmitter/receiver circuitry of a bus-type local area network based on CSMA/CD (carrier sense multiple access with collision detection), a hybrid circuit can be used for the separation or isolation of simultaneously transmitted and received signals at one of the stations in the network. This separation allows the implementation of collision detection at larger transmit to receive level ratios than without a hybrid. Thus, larger transmission distances can be achieved by using a hybrid. However, a hybrid must be designed for a fixed nominal transrission line impedance. This means that the maximum attenuation of the transmitted signal crosstalk into the received signal is obtained for only one transmission line impedance. In addition, the crosstalk attenuation for a given transmission line impedance will depend on the tolerances of the components that comprise the hybrid. Thus, any change in the impedance of the transmission line or in the values of the components in the hybrid, such as due to a temperature change, can prevent the hybrid from optimally cancelling the transmitted signal crosstalk from the received signal.

The above-cited U.S. patent application Ser. No. 623,302 provides, in a transceiver of a local station in a local area network, a unique adaptive hybrid circuit for adaptively cancelling crosstalk from a transmitter to a receiver. This unique adaptive hybrid circuit is comprised of a comparator, an integrator and an adjustment circuit. The output from the receiver is compared in the comparator with a transmit signal to develop a first signal which causes the integrator to develop a second signal having an amplitude which varies as a function of the state of the first signal. The transmitted signal, the second signal and a composite signal comprised of the received signal and a crosstalk signal from the transmitter are applied to the adjustment circuit. In the adjustment circuit, the transmitted signal is multiplied by the second signal to develop a crosstalk cancelling signal which varies automatically to cancel the crosstalk signal in the composite signal for any given transmission line impedance. When the crosstalk is cancelled, the output of the adjustment circuit only contains the received signal which is detected by the receiver.

In the operation of the adaptive hybrid circuit of the above-cited U.S. patent application Ser. No. 623,302, two operational problems may occur.

1. A first operational problem may occur as a result of a collision during the initial part of any subsequent transmission after the completion of a training mode. During the training mode of operation, the transceiver of the local station adjusts (trains) its adaptive hybrid circuit to minimize any crosstalk from the transmitter to the receiver of the transceiver. After the completion of the training mode, a normal mode of operation is entered. During this normal mode of operation the transceiver continues to adjust the adaptive hybrid circuit during each subsequent transmission. A collision (simultaneous attempt to transmit) with another station may occur in the initial part of a subsequent transmission. Because some period of time is needed to detect and react to the collision and to disable the adaptive hybrid circuit, the adjustment of the adaptive hybrid circuit may be disrupted by that collision.

2. A second operational problem may occur as a result of an undesired change in the adjustment of the adaptive hybrid circuit between two consecutive transmissions. Between two consecutive transmissions the adjustment of the adaptive hybrid circuit is latched such that the hybrid control voltage does not change between transmissions. However, any of a number of events may occur to cause an undesired change in the setting of the adjustment of the adaptive hybrid circuit between transmissions. Such an undesired change may be caused by: (a) a noise spike that changes the count of the counter used in the integrator of the adaptive hybrid circuit, (b) a large variation in the power supply voltage that changes the adjustment of the adaptive hybrid circuit or (c) a variation in one of the components in the adaptive hybrid circuit due to shock or vibration. As a result of one or more of the above causes of an undesired change in the adjustment of the adaptive hybrid circuit, the adaptive hybrid circuit may become misadjusted such that at the start of the next transmission crosstalk occurs between the transmitter and receiver of the transceiver. This misadjustment of the adaptive hybrid circuit may be large enough to result in a false collision detection which will disable the adjustment of the adaptive hybrid circuit and cause the adaptive hybrid circuit to remain misadjusted. Repeated attempts to transmit will produce the same result, thereby producing a false collision detect deadlock situation from which the adaptive hybrid does not automatically recover.

SUMMARY OF THE INVENTION

According to the present invention, there is provided a control circuit for improving the operational capabilities of the adaptive hybrid circuit of the above-cited U.S. patent application Ser. No. 623,302 by disabling the adjustment of the adaptive hybrid circuit during the initial part of each subsequent transmission after the completion of the training mode, and by automatically returning the operation of the adaptive hybrid circuit to the training mode when a number of consecutive transmissions has resulted in a preselected number of successive collisions.

In accordance with one aspect of the invention, there is provided in a local area network having a plurality of stations coupled to a transmission line over which signals are being simultaneously transmitted and received and wherein each station includes a station controller, a transmitter, a receiver and an adaptive hybrid circuit coupled to the transmission line and between the transmitter and the receiver for adaptively cancelling crosstalk from the transmitter to the receiver, a control circuit in each station for controlling the operation of the adaptive hybrid circuit in the station, said control circuit comprising, in combination, means responsive to a request-to-send signal from the station controller for generating a first signal to enable a signal to be transmitted by the transmitter; and means responsive to the first signal for enabling the adaptive hybrid circuit to adaptively cancel crosstalk from the transmitter to the receiver after a preselected period of time after the start of each transmission.

In accordance with another aspect of the invention there is provided in a local area network having a plurality of stations coupled to a transmission line over which signals are being simultaneously transmitted and received and wherein each station includes a station controller, a transmitter, a receiver and an adaptive hybrid circuit coupled to the transmission line and between the transmitter and the receiver for adaptively cancelling crosstalk from the transmitter to the receiver, a control circuit in each station for controlling the operation of the adaptive hybrid circuit in the station, said control circuit comprising, in combination, first means responsive to a request-to-send signal from the station controller when no energy signal is being generated by the receiver for generating a first signal to enable a signal to be transmitted by the transmitter, the absence of said energy signal indicating that no signal is being received by the receiver; second means responsive to said first signal and to either a first reset signal from the station controller or to a second reset signal for causing a training mode of operation for a preselected duration of time and being further responsive to each subsequent first signal after the end of said training mode of operation for causing a normal mode of operation for the duration of each subsequent first signal; third means for generating an adjust enable signal during the training mode and during each normal mode when no collision signal is generated; fourth means responsive to a subsequent first signal during a normal mode of operation for generating a collision signal each time that an energy signal is applied thereto; and fifth means for counting successive ones of said collision signals for generating said second reset signal when a preselected number of successive collisions has occurred.

In accordance with another aspect of the invention there is provided in a local area network having a plurality of stations coupled to a transmission line over which signals are being simultaneously transmitted and received and wherein each station includes a station controller, a transmitter, a receiver and an adaptive hybrid circuit coupled to the transmission line and between the transmitter and the receiver for adaptively cancelling crosstalk from the transmitter to the receiver, a control circuit in each station for controlling the operation of the adaptive hybrid circuit in the station, said control circuit comprising, in combination, first means responsive to a request-to-send signal from the station controller and to the absence of an energy signal indicative of a signal received by the receiver for generating a first signal to enable a signal to be transmitted by the transmitter; second means selectively responsive to said first signal, a reset signal, and a second signal for generating a third signal; third means selectively responsive to said first and third signals for generating a hybrid disable signal for a first preselected period of time at the beginning of each transmitted signal that occurs during the absence of said third signal and for further generating said second signal after a second preselected period of time; and fourth means selectively responsive to said first signal and to the absence of said hybrid disable signal for generating an adjust enable signal to enable the adaptive hybrid circuit to automatically adjust itself to minimize crosstalk from the transmitter to the receiver.

In accordance with another aspect of the invention, there is provided in a local area network having a plurality of stations coupled to a transmission line over which signals are being simultaneously transmitted and received and wherein each station includes a station controller, a transmitter, a receiver and an adaptive hybrid circuit coupled to the transmission line and between the transmitter and the receiver for adaptively cancelling crosstalk from the transmitter to the receiver, a control circuit in each station for controlling the operation of the adaptive hybrid circuit in the station, said control circuit comprising, in combination, first means responsive to a request-to-send signal from the station controller and to the absence of an energy signal indicative of a signal received by the receiver for generating a first signal to enable a signal to be transmitted by the transmitter; second means selectively responsive to said first signal, a first reset signal from the station controller or a second reset signal, a second signal, and said energy signal for generating a collision disable signal during a first preselected period of time after said first signal is generated and for further generating a third signal during a training mode of operation; third means selectively responsive to said first and third signals for generating a hybrid disable signal for a second preselected period of time at the beginning of each transmitted signal that occurs during the absence of said third signal and for further generating said second signal after said first preselected period of time; fourth means responsive to said first signal and to the absences of said hybrid disable signal and a collision signal for generating an adjust enable signal to enable the adaptive hybrid circuit to automatically adjust itself to minimize crosstalk from the transmitter to the receiver; fifth means responsive to said first signal and to the absence of said collision disable signal for generating said collision signal each time that said energy signal is applied thereto; and sixth means responsive to said collision signal and to the absence of said third signal for generating said second reset signal when a preselected number of successive collisions has occurred.

It is, therefore, an object of this invention to provide a control circuit to improve the operational capabilities of an adaptive hybrid circuit.

Another object of this invention is to provide a control circuit to selectively disable the adjustment of the adaptive hybrid circuit to prevent a collision from disrupting its adjustment during the initial part of each subsequent transmission after the completion of a training mode.

Another object of this invention is to provide a control circuit to prevent false collision detect deadlock due to an undesired change in the setting of the adjustment of the adaptive hybrid circuit between transmissions.

Another object of this invention is to provide a control circuit which automatically returns the operation of the adaptive hybrid circuit to the training mode after a number of consecutive transmissions has resulted in a preselected number of successive collisions.

A further object of this invention is to provide a control circuit which automatically prevents a collision from disrupting the adjustment of the adaptive hybrid circuit during the initial part of each subsequent transmission after the completion of the training mode and which also automatically prevents a false collision detect deadlock situation whenever an undesired change in the setting of the adjustment of the adaptive hybrid circuit occurs between transmissions.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein.

DESCRIPTION OF THE PREFERRED EMBODIMENT

It should be noted at this time that, throughout this description of the preferred embodiment, the presence of a slash (/) following either a symbol or an acronym represents the logical inversion of that symbol or acronym.

Although the invention will be described in relation to its application in a local area network employing a serial bus, it should be realized that its application should not be restricted to such utilization.

Figure 1:
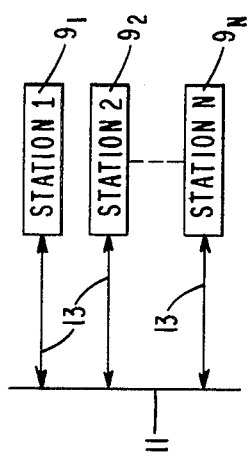
FIG. 1 is a schematic block diagram of a plurality of communications stations individually coupled to a common transmission medium to form a local area network.

Referring now to FIG. 1, there is shown a communications network including a plurality of stations $9_1, 9_2 \ldots 9_N$ connected to a serial data bus or transmission line 11 preferably embodied as a coaxial cable. Each of these stations $9_1, 9_2 \ldots 9_N$ is connected to the transmission line 11 by an associated twowire connection or tap 13 for transmitting data into the transmission line 11 as well as receiving data from the transmission line 11. The communications network forms a local area network (LAN) utilizing the well-known CSMA/CD (carrier sense multiple access with collision detection) protocol. Briefly, if a station detects no activity on the transmission line 11, then the station may start transmitting. If two stations start transmitting simultaneously or substantially simultaneously, then a "collision" occurs. This collision is detected by both stations and they will both abort transmission and re-try transmission after a random time period.

Figure 2:
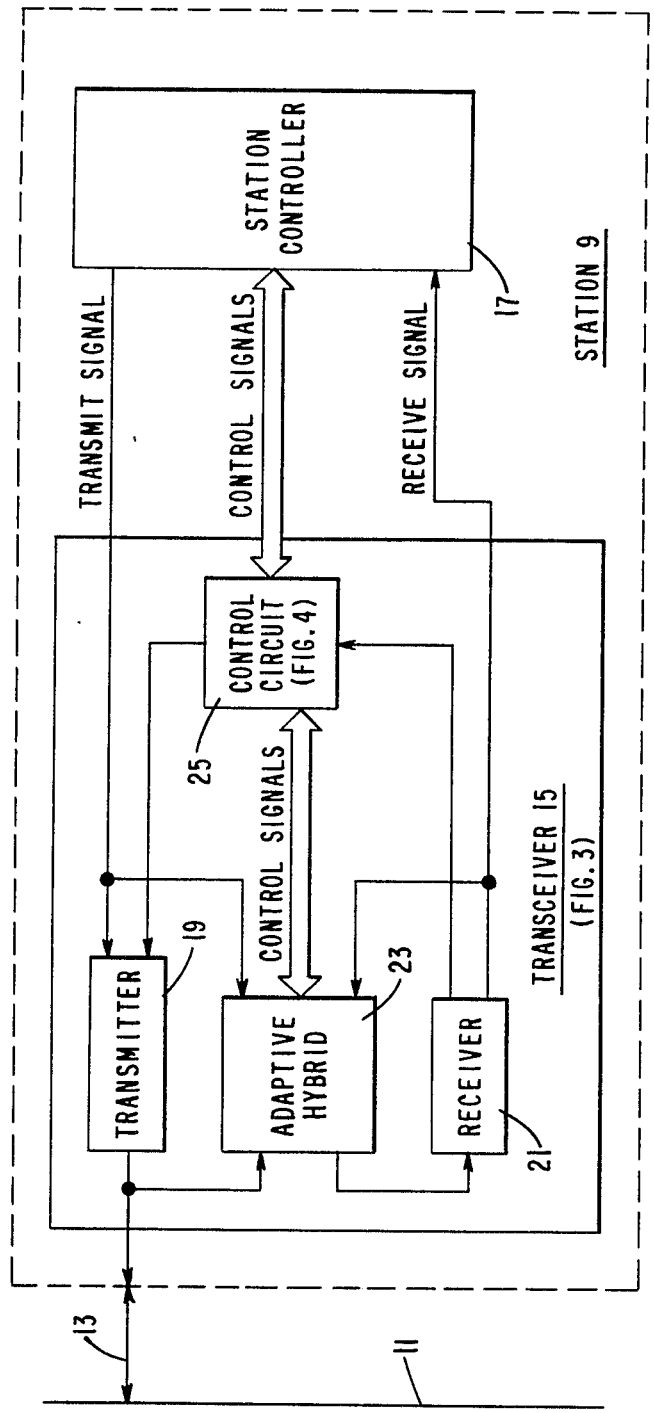
FIG. 2 is a schematic block diagram of a typical station in a local area network, including the control circuit of the invention.

Referring to FIG. 2, there is shown a block diagram of a typical station 9. The station 9 includes a transceiver 15 which is coupled to a station controller 17. The transceiver 15 includes a transmitter 19, a receiver 21, an adaptive hybrid circuit 23 and a control circuit 25.

In operation, a TRANSMIT signal comprised of data to be transmitted is applied from the controller 17 to the transmitter 19 for signal processing and transmission onto the transmission line 11 by way of the associated tap 13. Signals received from the transmission line 11 are applied via the tap 13 and adaptive hybrid 23 to the receiver 21 for detection. A detected RECEIVE signal is applied from the receiver 21 to the controller 17 for subsequent utilization by the controller 17. Bidirectional control signals are selectively utilized by the control circuit 25 and station controller 17 for proper timing and control operations of the transceiver 15. By way of additional bidirectional control signals, the control circuit 25 of the invention controls the operation of the adaptive hybrid 23 to improve the operational capabilities of the adaptive hybrid 23. As will be explained later, the adaptive hybrid 23 minimizes the crosstalk from the transmitter 19 to the receiver 21 so that a signal on the transmission line 11 from a remote station can be detected while the station 9 is transmitting. A detailed description of the station controller 17 is unnecessary for an understanding of the present invention.

Figure 3:
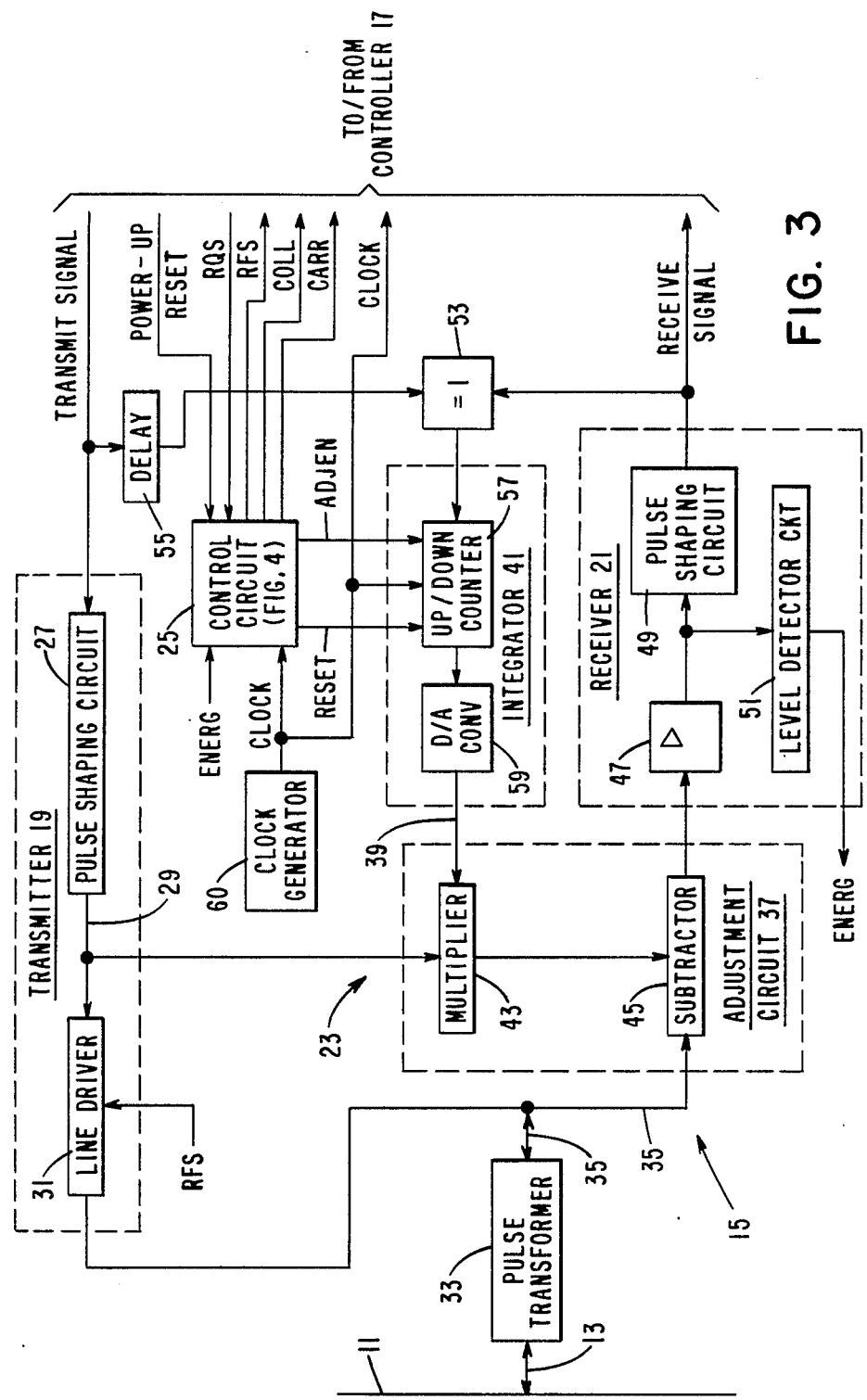
FIG. 3 is a schematic block diagram of a transceiver in the station of FIG. 2, which transceiver includes a transmitter, a receiver, an adaptive hybrid circuit coupled between the transmitter and receiver, and the control circuit of the invention.

Referring now to FIG. 3, there is shown a block diagram of the transceiver 15. A TRANSMIT signal comprised of Manchester coded data to be transmitted is supplied at a rate of one megabit (1 Mbit) per second from the controller 17 (FIG. 2) to a pulse shaping circuit 27. The pulse shaping circuit 27 smooths the sharp transitions in the Manchester coded TRANSMIT to suppress harmonics in that transmit signal. In addition, the pulse shaping circuit 27 also provides preemphasis to the TRANSMIT signal to compensate for part of the subsequent distortion of that TRANSMIT signal which is introduced by the transmission line 11. In an exemplary implementation the pulse shaping circuit 27 can include a shift register, a buffer, a resistor ladder network and an analog filter. However, it should be understood that the pulse shaping circuit 27 can be implemented differently and since the details of the pulse shaping circuit 27 are not essential to an understanding of the present invention, the pulse shaping circuit 27 will not be further described.

The output of the pulse shaping circuit 27 is applied via a line 29 to a line driver 31, which together with the pulse shaping circuit 27 may comprise the transmitter 19. The line driver 31 may include two amplifiers (not shown) used as current sources and driven in antiphase (180 degrees out of phase with each other).

The transmitter 19, as well as the receiver 21 (via the adaptive hybrid 23), are coupled to the transmission line 11 via tap 13 by means of a pulse transformer 33. The transformer 33 provides the common mode rejection for the receiver 21 and the ground isolation to avoid current (A.C. mains) problems.

In operation, the output of the line driver 31 is applied by way of a line 35 to drive the pulse transformer 33. When so driven, the pulse transformer 33 feeds the output transmit signal from the transmitter 19 onto the transmission line 11 via the associated tap 13. However, in certain environments the pulse transformer 33 may be omitted.

As indicated in FIG. 3, any signal transmitted onto the transmission line 11 from a remote station is received from the transmission line 11 via the tap 13 and transformer 33. As a result, the line 35 can carry a composite signal formed by the output signal from the line driver 31 together with any signal which may be received from the transmission line 11 via the tap 13 and pulse transformer 33.

The line 29 from the output of the pulse shaping circuit 27, line 35 from the output of the line driver 31 and a line 39 from the output of an integrator 41 are all connected to an adjustment circuit 37. The adjustment circuit 37 includes a multiplier 43 and a combiner or subtractor 45. A pulse shaped transmit signal on the line 29 and the signal on the line 39 are multiplied together in the multiplier 43 to adaptively develop a product signal which is an estimate of the crosstalk (from the transmitter 19) that may be contained in the composite signal on the line 35. This crosstalk estimate is subtracted in the subtractor 45 from a composite signal on the line 35 to cancel out the crosstalk (from the transmitter 19) that may be contained in that composite signal. The difference signal at the output of the subtractor 45 is the output of the adjustment circuit 37. Thus, only a received signal from the transmission line is adaptively developed at the output of the adjustment circuit 37.

As shown in FIG. 3, the adjustment circuit 37 includes a physically separate standard multiplier circuit 43 and a standard adder/subtractor or combiner circuit 45 functioning as a subtractor. However, in an alternative arrangement (not shown) of the adjustment circuit 37, the multiplier 43 and subtractor 45 may be effectively combined into one integral unit. A detailed description of such an alternative arrangement of the adjustment circuit 37 is unnecessary for an understanding of the present invention.

The output of the adjustment circuit 37 is applied to the receiver 21 which comprises an amplifier 47, a pulse shaping circuit 49 and a level detector circuit 51. The amplifier 47 has a high input impedance to minimize the loading of the transmission line 11. In addition, the amplifier 47 preferably includes filter characteristics to compensate for part of the distortion of the received signal that is generated by the transmission line 11. The design of such an amplifier 47 is well-known by those skilled in the art and, therefore, no further description of the amplifier 47 is needed.

The output of the amplifier 47 is applied to the pulse shaping circuit 49 and to a level detector circuit 51. The pulse shaping circuit 49 may include a standard high speed comparator to digitize the output of the amplifier 47 to develop a digital RECEIVE signal. This RECEIVE signal, which is the output of the receiver 21, is applied to digital circuits (not shown) in the station controller 17 (FIG. 2) for subsequent processing and also applied to an EXCLUSIVE-OR (EX-OR) gate 53 (to be discussed).

The level detector circuit 51 is implemented to develop an energy (ENERG) signal when it detects the presence of any received signal above a predetermined threshold level. Such an ENERG signal indicates the detection of a transmission from a remote station on the transmission line 11. It should also be noted that a large burst of noise caused by, for example, lightning could also cause the level detector circuit 51 to develop an ENERG signal. This ENERG signal is applied to the control circuit 25, which interprets the ENERG signal as representing the detection of a collision or the detection of a carrier as a function of the state of the transmitter 19, as described below.

Initially, a POWER-UP RESET signal from the controller 17 (FIG. 2) places the control circuit 25 in an idle state in which the transceiver 15 can either receive any input received signal or transmit a message. When the controller 17 desires to send a message or transmission, it applies a request-to-send (RQS) signal to the control circuit 25. If no ENERG signal is being received by the control circuit 25 at the time of the RQS signal, the control circuit 25 develops a ready-for-sending (RFS) signal to enable both the controller 17 and the line driver 31 of the transmitter 19. Upon receiving the RFS signal, the controller 17 sends a digital transmit signal, which contains the message to be sent, to the enabled transmitter 19. If an RFS signal is being generated at the time that an ENERG signal is being received, the control circuit 25 interprets the ENERG signal as the detection of a collision and applies a collision (COLL) signal to the controller 17 to terminate the RQS signal and, hence, the RFS signal and the transmission. On the other hand, if no RFS is being generated at the time that an ENERG signal is being received, the control circuit 25 interprets the ENERG signal as the detection of a carrier and applies a carrier (CARR) signal to the controller 17.

The circuitry of FIG. 3 readily lends itself to an alternative arrangement for generating an RFS signal. In this alternative arrangement the application of an ENERG signal from the receiver 21 causes the control circuit 25 to develop a high CARR signal to prevent the station controller 17 from generating the RQS signal. Thus, in this alternative arrangement the station controller 17 will only generate an RQS signal when the CARR signal is low. The generation of an RQS signal by the station controller 17 will then cause the control circuit 25 to directly generate the RFS signal.

As stated before, the digital receive signal output of the pulse shaping circuit 49 is applied to an EXCLUSIVE-OR (EX-OR) gate 53. The digital transmit signal from the controller 17 is also applied to the gate 53 via a delay 55. Delay 55 compensates for circuit delays in the adaptive hybrid circuit 23 and receiver 21. The EXCLUSIVE-OR gate 53 functions as a digital comparator by comparing its input digital transmit and receive signals with each other. When the transmit and receive signals have the same logical states, the gate 53 develops a 0 state output. Similarly, when the transmit and receive signals have different logical states, the gate 53 develops a 1 state output.

The output of the EXCLUSIVE-OR gate 53 is applied to the integrator 41. The EXCLUSIVE-OR gate 53, integrator 41 and adjustment circuit 37 essentially comprise the adaptive hybrid circuit 23 of FIG. 2. The adaptive hybrid 23 and receiver 21 form a loop for adaptively cancelling out any transmitter crosstalk from the output of the adjustment circuit 37 (input to the receiver 21).

The integrator 41 includes a digital up/down counter 57 and a digital-to-analog converter (D/A CONV.) 59. The counter 57 is initially preset to a predetermined count by a reset signal from the control circuit 25. Clock pulses from a clock generator 60 are applied to the control circuit 25, to the count input of the counter 57 and also to the controller 17 to control the transmit clock rate of the TRANSMIT signal. During any period of time that the controller 17 generates a TRANSMIT signal, the control circuit 25 selectively applies an adjust enable (ADJEN) signal to the counter 57 to enable the counter 57 to count clock pulses during that transmission. When enabled by the ADJEN signal, the up/down counter 57 counts up or down as a function of the logical state of the up/down signal from the EXCLUSIVE-OR gate 53. For example, when the transmit and receive signals to the gate 53 have the same logical states, the 0 state output of the gate 53 forces the counter 57 to count clock pulses by decrementing its count. Conversely, when the TRANSMIT and RECEIVE signals to the gate 53 have different logical states, the 1 state output of the gate 53 forces the counter 57 to count clock pulses by incrementing its count. Outputs from the stages (not shown) of the counter 57 are applied to the digital-to-analog converter 59 which may be formed by a resistor ladder network (not shown). The digital-to-analog converter 59 converts the digital count from the counter 57 to an analog signal which is representative of the digital count in the counter 57.

It will be appreciated that an advantage of utilizing a digital counter 57 in the integrator 41 is that the count of the counter 57 should not change between transmissions.

The analog signal from the converter 59 is applied over line 39 to the adjustment circuit 37. The signal on the line 39 operates as a multiplication factor for the pulse shaped transmit signal on line 29 to enable the multiplier 43 to develop the crosstalk estimate which, as stated before, is subtracted in the subtractor 45 from the composite signal on line 35 to adaptively develop a residual received signal.

It was previously stated that the control circuit 25 improves the operational capabilities of the adaptive hybrid 23. More specifically, as will be explained, the control circuit 25 prevents any improper adjustment of the adaptive hybrid 23 during both training and normal modes of operation and also prevents a false collision detect deadlock situation from developing due to an undesired change in the adjustment of the adaptive hybrid 23 between transmissions from the transmitter 19. The control circuit 25 and its operation will be discussed in detail by now referring to FIGS. 4–10.

Figure 4:
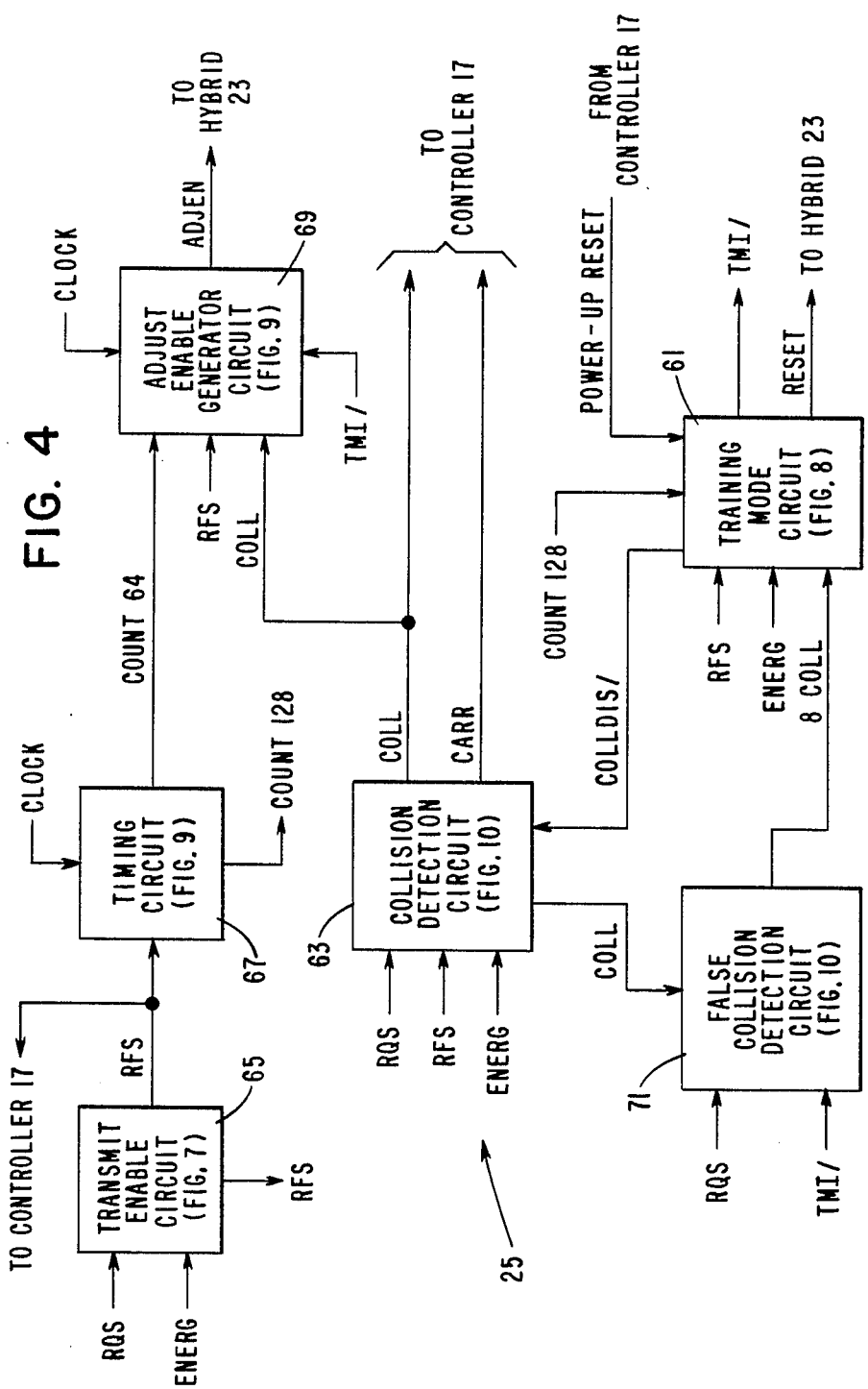
FIG. 4 is a schematic block diagram of a preferred embodiment of the control circuit of FIGS. 2 and 3.
Figure 5:
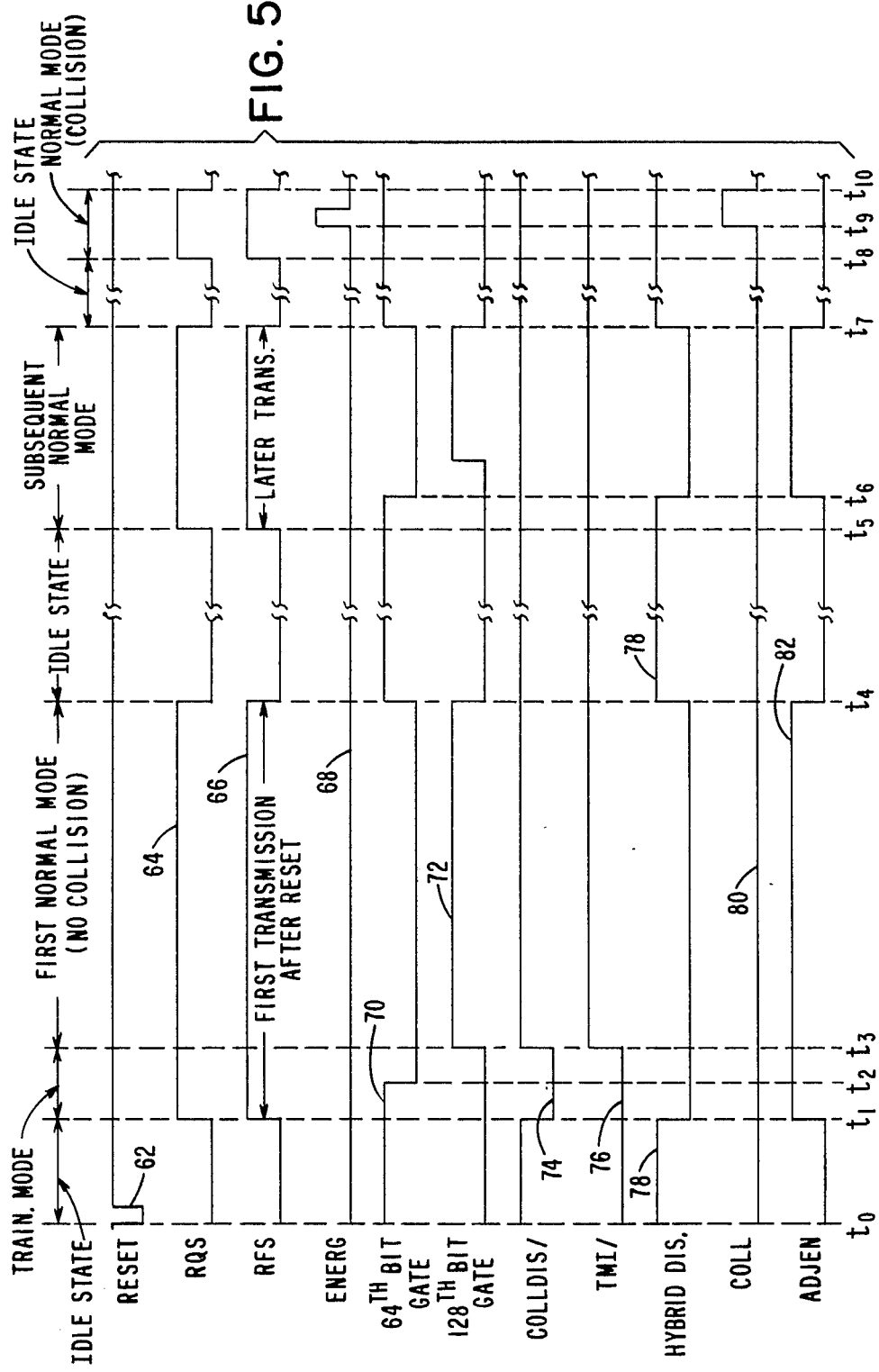
FIG. 5 illustrates waveforms useful in explaining the operation of the circuitry of FIGS. 3, 4 and 7–10.

The control circuit 25 will first be discussed by referring to FIGS. 4 and 5, wherein FIG. 4 illustrates a schematic block diagram of the control circuit 25 and FIG. 5 illustrates waveforms generated or utilized by the control circuit 25.

Upon initial start-up of the transceiver 15 (FIG. 3), a POWER-UP RESET signal is applied from the controller 17 (FIG. 2) to a training mode circuit 61 at time $t_0$. This POWER-UP RESET signal is used by the circuit 61 (FIG. 4) to generate a RESET pulse 62 (FIG. 5) at time $t_0$ to cause the control circuit 25 to go into an "idle state". In this idle state, the transceiver 15 can either receive an incoming transmission from a remote one of the stations $9_1 \ldots 9_N$ (FIG. 1) or transmit a message onto the transmission line 11 (FIG. 3) if there is no incoming transmission.

If data is being received, the receiver 21 (FIG. 3) will generate both a receive signal and a high ENERG signal. In this case, a collision detection circuit 63 (FIG. 4) will generate and apply a CARR signal to the controller 17 to prevent the controller 17 from generating an RQS signal to initiate a transmit operation until after ENERG goes low.

Assume that no data is being received and, hence, the receiver 21 (FIG. 3) generates an ENERG signal 68 (FIG. 5) which is low. Further assume that under these conditions, the controller 17 initiates a transmit operation by generating an RQS (request-for-sending) signal 64 starting at time $t_1$.

The RQS signal 64 and the ENERG signal 68 are both applied to a transmit enable circuit 65 (FIG. 4). Since ENERG 68 is low when RQS 64 is applied, the transmit enable circuit 65 generates an RFS (ready-for-sending) signal 66. This RFS signal 66 enables the controller 17 (FIG. 2) to apply its TRANSMIT signal to the transmitter 19 (FIG. 3) and enables the line driver 31 in the transmitter 19 to transmit data.

As shown in FIG. 5, this RFS signal 66 terminates the idle state at time $t_1$. Note that this RFS signal 66 at time $t_1$ is the first RFS signal after the RESET signal 62 is generated at time $t_0$. Therefore, this RFS signal 66 starting at time $t_1$ also causes the control circuit 25 to go into a TRAINING MODE of operation at time $t_1$ by causing the training mode circuit 61 (which has been placed in a reset condition by the RESET signal 62 at time $t_1$) to output a low value of a TMI/ (training mode indication) signal 76.

It should be noted at this time, as indicated in FIG. 5, that the control circuit 25 forces the adaptive hybrid 23 into a TRAINING MODE of operation during the time that TMI/76 is low and RFS 66 is high and forces the adaptive hybrid 23 into a NORMAL MODE of operation during the time that both TMI/76 and RFS 66 are high.

The RFS signal 66 is also applied to a timing circuit 67 (FIG. 4) to enable the timing circuit 67 to count clocks from the clock generator 60 (FIG. 3). After sequentially counting clocks, the timing circuit 67 develops a COUNT 64 signal (FIG. 4) when 64 clocks are counted and a COUNT 128 signal (FIG. 4) when 128 clocks are counted.

As will be explained later, the COUNT 64 signal is used by an adjust enable generator circuit 69 (FIG. 4) to internally develop a 64th BIT GATE signal 70 (FIG. 5) which goes low at time $t_2$, which is 64 clock periods after the start of RFS at time $t_1$. In a similar manner, the COUNT 128 signal is used by the training mode circuit 61 to internally develop a 128th BIT GATE signal 72 (FIG. 5) which goes high at time $t_3$, which is 128 clock periods after the start of RFS at time $t_1$.

Clock, RFS 66, COUNT 64 and TMI/ signals, as well as a COLL (collision) signal, are applied to the adjust enable generator circuit 69. If COLL is low, the circuit 69 operates to provide an ADJEN (adjust enable) signal 82 to the up-down counter 57 in the adaptive hybrid 23 (FIG. 3) during the period of an RFS signal 66 when TMI/ 76 is low and during that portion of the period of an RFS signal 66 after the occurrence of the COUNT 64 signal when TMI/ is high. The ADJEN signal 82 enables the adaptive hybrid 23 to automatically adjust itself to minimize crosstalk from the transmitter 19 to the receiver 21 (FIG. 3).

In addition to generating the TMI/ signal 76 during a training mode of operation, the training mode circuit 61 also generates a COLLDIS/ (collision disable) signal 74 to prevent the collision detection circuit 63 from generating a COLL (collision) signal 80 during a training mode of operation.

After the end of the TRAINING MODE at time $t_3$, COLLDIS/ 74 is removed from the collision detection circuit 63 and the control circuit 25 causes the transceiver 15 (FIG. 3) to go into its first NORMAL MODE of operation. The removal of the COLLDIS/ signal 74 enables the collision detection circuit 63 to generate a COLL signal 80 whenever an RFS signal 66 and a high ENERG signal 68 are simultaneously applied to the circuit 63. However, assume (as shown in FIG. 5) that no collision (simultaneous attempt to transmit with another one of the stations $9_1 \ldots 9_N$ in FIG. 1) occurs during this first normal mode of operation between times $t_3$ and $t_4$. In such a case, no high ENERG signal 68 is developed during the remaining part of the transmission between times $t_3$ and $t_4$. Consequently, at time $t_4$, the controller 17 terminates the RQS signal 64 at the end of its TRANSMIT signal and the control circuit 15 returns the transceiver 15 to its idle state.

Assume that the controller 17 wants to send another TRANSMIT signal at time $t_5$. It, therefore, generates an RQS signal 64 starting at time $t_5$ to terminate the idle state at time $t_5$. The control circuit 25 then immediately enters a NORMAL MODE of operation. No TRAINING MODE is generated after the idle state (between times $t_4$ and $t_5$) since a TRAINING MODE is only initiated by a RESET signal 62.

The RFS signal 66 is developed by the transmit enable circuit 65 to enable the controller 17 and transmitter 19 to transmit, as discussed before. The 64th BIT GATE signal 70 and 128th BIT GATE signal 72 are similarly developed as discussed before. However, COLLDIS/ 74 and TMI/ 76 both remain high since no TRAINING MODE of operation is involved during this transmission. In addition, the ADJEN signal 82 does not begin until the 64th BIT GATE signal 70 goes low at time $t_6$, which occurs 64 bit times into the transmission to prevent any adjustment of the adaptive hybrid circuit 23 until a time when there is no chance of a collision occurring during this transmission. This will be more fully discussed later.

Assume, as shown in FIG. 5, that no collision occurs during this NORMAL MODE and that the controller 17 terminates the RQS signal 64, and, hence, the RFS signal 66 and the transmission also terminate at time $t_7$ in the same manner as previously discussed. As a result, the control circuit 25 once again causes the transceiver 15 to go into an idle state at time $t_7$.

To illustrate the effect of a collision on the transceiver 15, assume that another transmission is successfully initiated by an RQS signal 64 at time $t_8$ and that a high ENERG signal is detected by the receiver 21 at time $t_9$. Since the COLLDIS/ signal 74 was terminated at time $t_3$, the simultaneous application of an RFS signal 66 and a high ENERG signal 68 to the collision detection circuit 63 at time $t_9$ causes the circuit 63 to generate a COLL signal 80. Thus, a COLL signal 80 is only generated when the transceiver 15 (FIG. 2) is simultaneously trying to transmit and receive data. A COLL signal 80 causes the controller 17 to terminate the RQS signal 64 which, in turn, causes the transmit enable circuit 65 to terminate the RFS signal 66 to end a transmission and also causes the collision detection circuit 63 to terminate the COLL signal 80. At some time later, the controller 17 generates another RQS signal 64. If no high ENERG signal 68 is being received at that time, the transmit enable circuit 65 generates another RFS signal 66 to initiate a transmit mode of operation. However, if a high ENERG signal is being applied to the circuits 65 and 63 at the same time that the RQS signal 64 is applied, another COLL signal 80 will be generated to prevent or terminate a transmission, as described above.

Each COLL signal 80 is applied to a false collision detection circuit 71 (FIG. 4). If an exemplary 8 consecutive COLL signals 80 (FIG. 5) occur during a NORMAL MODE of operation (where TMI/ 76 is high), the circuit 71 will develop an 8 COLL signal (FIG. 10) to indicate the detection of a false collision (to be explained).

This 8 COLL signal is utilized by the training mode circuit 61 to reset itself to develop a low TMI/ 76 signal. Thus, when the next RFS signal 64 is generated by circuit 65, the transceiver 15 (FIG. 3) is returned to the TRAINING MODE of operation. It will be recalled that during the TRAINING MODE of operation, the training mode circuit 61 develops a low COLLDIS/ signal 74 to prevent the collision detection circuit 63 from generating a high COLL signal 80 during the TRAINING MODE. Since COLL 80 is low, the adjust enable generator circuit 69 is enabled during the TRAINING MODE to provide an ADJEN signal 82 to the adaptive hybrid 23. Thus, the adaptive hybrid 23 automatically readjusts itself to cancel crosstalk without being affected by a collision that may occur during the TRAINING MODE.

Before proceeding with a detailed description of the various circuits of the control circuit 25 that are shown in FIG. 4, the overall operation of the control circuit 25 will be further analyzed to provide the reader with a better understanding of the invention. More particularly, the state diagram of FIG. 6 will be discussed to broadly show the overall operation of the transceiver 15 (FIG. 3) and how the control circuit 25 specifically improves the operational capabilities of the adaptive hybrid 23 (FIG. 3).

Figure 6:
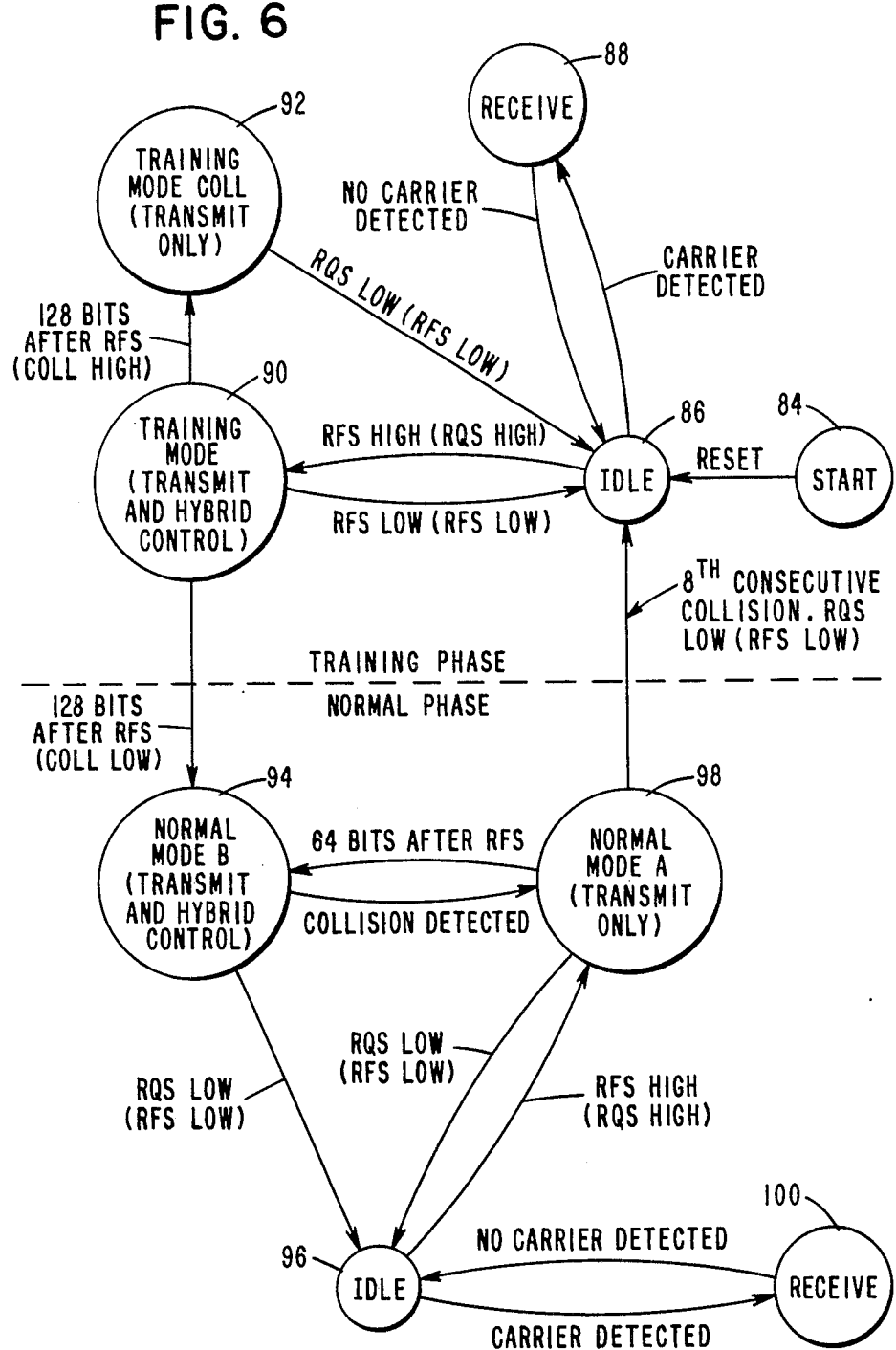
FIG. 6 is a state diagram useful in explaining the operation of the control circuit of FIG. 4 in the transceiver of FIG. 3 during training and normal phases of operation.

Referring now to the state diagram of FIG. 6, the operations shown above the horizontal dashed line occur during a TRAINING PHASE, while the operations shown below the horizontal dashed line occur during a NORMAL PHASE.

DURING A TRAINING PHASE

At the START 84 of the operation of the transceiver 15, a (POWER-UP) RESET is applied from the controller 17 (FIG. 2) to the training mode circuit 61 (FIG. 4) to cause the transceiver 15 to go into an IDLE state 86. In this IDLE state 86, the transceiver 15 can either receive an incoming message or, if no message is being received, transmit a message.

A. Reception of a Message

When a high ENERG signal 68 from the receiver 21 (FIG. 3) is interpreted by the collision detection circuit 63 (FIG. 4) as a carrier (CARR) signal, the controller 17 places the transceiver 15 in a RECEIVE state 88. When the received message is completed, the ENERG signal 68 goes low, the CARR signal goes low and the control circuit 25 (FIG. 4) returns the transceiver 15 to the IDLE state 86 again.

B. Transmission of a Message

To transmit a message, the controller 17 sends a high RQS signal 64 to the transmit enable circuit 65 (FIG. 4). If the ENERG signal 68 is low at that time, the circuit 65 generates a high RFS signal 66 to enable the control circuit 25 to force the transceiver 15 into a TRAINING MODE 90. In the TRAINING MODE 90, the transmitter 19 (FIG. 3) is transmitting the message from the controller 17 while the adaptive hybrid 23 (FIG. 3) is being controllably adjusted by a high ADJEN signal 82 from the circuit 69 (FIG. 4) to minimize crosstalk from the transmitter 19 to the receiver 21.

If for some reason the controller 17 causes the RQS signal 64 to go low during the TRAINING MODE 90, then the control circuit 25 would cause the transceiver 15 to return to the IDLE state 86 of the TRAINING PHASE. However, assume that RQS remains high during the TRAINING MODE 90.

A first potential problem, which could arise during this TRAINING MODE 90, is prevented by the control circuit 25 in the following manner.

During the TRAINING MODE 90, the adaptive hybrid 23 is not properly adjusted for crosstalk cancellation. As a consequence, crosstalk will result at the output of the adjustment circuit 37 (FIG. 3) during the initial part of this TRAINING MODE 90, causing the receiver 21 to develop an erroneous high ENERG signal. Since the transceiver 15 is transmitting at this time, the collision detection circuit 63 would interpret this ENERG signal as a collision and apply a high COLL signal 80 (FIG. 5) to the controller 17 to terminate the transmission. This erroneous collision would prevent the adaptive hybrid 23 from properly adaptively adjusting itself within this first TRAINING MODE 90 after the control circuit 25 was RESET. However, the adjustment circuit 37 needs some time during this TRAINING MODE 90 to be adaptively adjusted. To avoid such an erroneous collision during the TRAINING MODE 90, the training mode circuit 61 (FIG. 4) applies a low COLLDIS/ signal 74 to the collision detection circuit 63 (FIG. 4) to prevent the circuit 63 from generating a high COLL signal 80 during the TRAINING MODE 90 (the exemplary first 128 bits of the first transmission after RESET) when the adaptive hybrid 23 is being trained. Thus, during the TRAINING MODE 90, TMI/ 76 is low, ADJEN 82 is high, COLLDIS/ 74 is low and COLL 80 is low.

If a remote station is transmitting into the transmission line 11 (FIG. 3) during the TRAINING MODE 90, then the adjustment of the adjustment circuit 37 will not be completed within the exemplary first 128 bits of transmission after RESET. After that exemplary 128 bit TRAINING MODE 90, there will still be a significant signal present at the output of the adjustment circuit 37, which signal will cause the level detector circuit 51 in the receiver 21 (FIG. 3) to apply a high ENERG signal 68 to the collision detection circuit 63. Since COLLDIS/ 74 also goes high at the end of the TRAINING MODE 90, the circuit 63 at this time will generate a high COLL signal 80 that forces the transceiver 15 temporarily into a TRAINING MODE COLL state 92. During the TRAINING MODE COLL state 92, TMI/ 76 is low, ADJEN 82 is low, COLLDIS/ 74 is high and COLL 80 is high.

The high COLL signal 80 is also applied to the controller 17 to cause the controller 17 to prematurely terminate the high RQS signal 64. This will cause the control circuit 25 to force the transceiver 15 to change from the TRAINING MODE COLL state 92 to the IDLE state 86 of the TRAINING PHASE. In such a case, the controller 17 will re-try another transmission after a random time period.

If no remote station is transmitting onto the transmission line 11, the exemplary 128 bit TRAINING MODE 90 will be sufficient for the adaptive hybrid 23 to adjust itself, as described before, so that the output of the adjustment circuit 37 is substantially zero. In such a case, at the end of the TRAINING MODE 90, the control circuit 25 causes the transceiver 15 to change from the TRAINING MODE 90 of the TRAINING PHASE to a NORMAL MODE B 94 of the NORMAL PHASE. It should be noted at this time that TMI/ 76 is always low during the TRAINING PHASE and is always high during the NORMAL PHASE.

DURING A NORMAL PHASE

During the NORMAL MODE B 94 of the NORMAL PHASE, the transmitter 19 continues to transmit the message while the adaptive hybrid 23 continues to be controlled by the high ADJEN signal 82. In the NORMAL MODE B 94, there are two ways that the transmission of a message can be stopped.

In a first way, the controller 17 causes the RQS signal 64 to go low which, for example, would happen at the end of message being transmitted. This would cause the transmit enable circuit 65 to terminate the RFS signal 66, and the control circuit 25 to terminate the transmission and change from the NORMAL MODE B 94 to the IDLE state 96 of the NORMAL PHASE.

In a second way, a collision could be detected during the NORMAL MODE B 94. Noise, or a transmission from a misbehaving remote station, could cause the receiver 21 to generate a high ENERG signal 68 during the NORMAL MODE B 94. This high ENERG signal 68 causes the collision detection circuit 63 to generate a high COLL signal 80 which immediately causes the adjust enable generator circuit 69 (FIG. 4) to terminate the high ADJEN signal 82. Thus, at this time, the control circuit 25 causes the transceiver 15 to change from a NORMAL MODE B 94 state (where the transmitter 19 is transmitting and the adaptive hybrid 23 is being adaptively controlled) to a NORMAL MODE A 98 state.

In the NORMAL MODE A 98, the transmitter 19 continues to transmit, but there is no longer any control or adjustment of the adaptive hybrid 23. This high COLL signal 80 is also applied to the controller 17 which subsequently terminates the high RQS signal 64, causing RFS 66 to go low and the transmission to be aborted. At this time, the control circuit 25 causes the transceiver 15 to go to the IDLE state 96 in the NORMAL PHASE. In the IDLE state 96 of the NORMAL PHASE, the transceiver 15 can either receive an incoming message or, if no message is being received, transmit a message.

A. Reception of a Message

The control circuit 25 can move from the IDLE state 96 of the NORMAL PHASE to the RECEIVE state 100 to receive data in a manner similar to that previously discussed, wherein the control circuit 25 moved from the IDLE state 86 of the TRAINING PHASE to the RECEIVE state 88 to receive data in the TRAINING PHASE. Basically, in the NORMAL PHASE, the control circuit 25 causes the transceiver 15 to change from an IDLE state 96 to a RECEIVE state 100 when the collision detection circuit 63 interprets a high ENERG signal 68 and a low RFS signal 66 as the detection of a carrier signal by generating a high CARR signal. When the circuit 63 drops the CARR signal low, the control circuit 25 returns the transceiver 15 to the IDLE state 96 of the NORMAL PHASE.

B. Transmission of a Message

If the ENERG signal 68 is low when the controller 17 supplies a high RQS signal 64 to the transmit enable circuit 65 (FIG. 4), the circuit 65 generates an RFS signal 66 which causes the control circuit 25 to force the transceiver 15 into the NORMAL MODE A state 98. In this NORMAL MODE A state 98, the transmitter 19 starts transmitting the message from the controller 17.

A second potential problem, which could arise during this NORMAL MODE A state 98, is prevented by the control circuit 25 as discussed below.

During the NORMAL PHASE (which occurs after the completion of the TRAINING MODE), the transceiver 15 continues adjusting (training) the adaptive hybrid 23 during any subsequent transmission from the transmitter 19. A collision with another station may occur in the initial part of a subsequent transmission. Because a collision detector, such as the collision detector circuit 63 (FIG. 4) needs time to react to a collision in order to generate a COLL (collision) signal to disable the adjustment of the adaptive hybrid 23, the adjustment of the adaptive hybrid 23 may be disrupted by such a collision before that adjustment of the adaptive hybrid 23 is disabled.

To prevent such a misadjustment of the adaptive hybrid 23 during an initial period of a transmission that occurs in the NORMAL PHASE (after the TRAINING MODE is completed), the adjust enable generator circuit 69 (FIG. 4) internally generates a high HYBRID DISABLE signal 78 (FIG. 5) (to be explained) to prevent the circuit 69 from generating a high ADJEN signal 78 during the initial period of such a transmission. As discussed below, typically, the period of the HYBRID DISABLE signal 78 is equal to the initial period of the first 64 bits of a transmission after RFS 66 is generated. Thus, the period of the NORMAL MODE A state 98 is equal to the initial period of the first 64 bits of transmission that starts during the NORMAL PHASE. The 64 bit period of the high HYBRID DISABLE signal 78 (e.g., between times $t_5$ and $t_6$ in FIG. 5), as well as of the NORMAL MODE A state 98, is determined in the following manner.

If the maximum length of an exemplary local area network is 3.6 kilometers, then the maximum propagation delay for transmissions from any point in the local area network to any other point in the local area network is 32 microseconds. Assume that each station in the local area network is controlled by a 1 megahertz clock from an associated clock generator 61 (FIG. 3). Then, 32 microseconds is equivalent to 32 bit times or 32 bits of transmission. So, 32 bits after the start of a first transmission from a first station, all other stations in the local area network will have detected the first transmission from that first station and will not start a transmission. However, a collision will occur if a second station starts a second transmission just before it detects the first transmission of the first station. The second transmission also has a maximum propagation delay of 32 bit times. Thus, the first station will detect a collision within the first 64 bits of its transmission. By disabling the adjustment of the adaptive hybrid 23 during the first 64 bits of the transmission during the NORMAL PHASE, the misadjustment of the adaptive hybrid 23 due to a collision is avoided.

Thus, in the 64 bit long NORMAL MODE A state 98, the transmitter 19 is transmitting, but the adjustment of the adaptive hybrid 23 is disabled by the 64 bit long high HYBRID DISABLE signal 78.

When the HYBRID DISABLE signal 78 goes low after 64 bits of transmission, the control circuit 25 will force the operation of the transceiver 23 from the NORMAL MODE A state 98 to the NORMAL MODE B state 94. It will be recalled that in the NORMAL MODE B state 94, the transmitter 19 is transmitting while the counter 57 in the integrator 41 of the adaptive hybrid 23 is being adaptively controlled by a high ADJEN signal 82. The detection of a collision during the NORMAL MODE B state 94 will immediately cause the control circuit 25 to force the operation of the transceiver 23 back to the NORMAL MODE A state 98 before the controller 17 returns the transceiver operation to the IDLE state 96 of a NORMAL PHASE.

A third potential problem which could arise during the NORMAL PHASE is prevented by the control circuit 25 in the following manner.

As described before, the adjustment of the adjustment circuit 37 (FIG. 3) occurs only when the local station 9 (FIG. 2) is transmitting. Between two transmissions of the station 9, the adaptive hybrid 23 is disabled or latched and should remain in a fixed position when the high ADJEN signal 82 is removed from the up/down counter 57 in the integrator 41 (FIG. 3) of the adaptive hybrid 23. However, any one of a number of events may cause an undesired change in the adjustment of the adaptive hybrid between transmissions. Such an undesired change may be caused by: a noise spike that changes the count of the up/down counter 57 (FIG. 3) in the integrator 41 of the adaptive hybrid 23; a large variation in the power supply voltage that changes the adjustment of the adaptive hybrid 23; or a variation in one of the components in the adaptive hybrid 23 due to shock or vibration. As a result of one or more of the above-identified causes of an undesired change in the adjustment of the adaptive hybrid 23, the adaptive hybrid 23 may become misadjusted while the control circuit 25 has the transceiver 15 in the IDLE state 96 of a NORMAL PHASE.

When the controller 17 later generates an RQS signal 64 to initiate a transmission, the control circuit 25 causes the operation of the transceiver 15 to change from the IDLE state 96 to the NORMAL MODE A state 98. The misadjustment of the adaptive hybrid 23 will cause crosstalk between the transmitter 19 and receiver 21 of the transceiver 15 at the start of this transmission. The crosstalk from the output of the adjustment circuit 37 of the hybrid 23 may be large enough to cause the receiver 21 to generate a high ENERG signal 68 which would result in a false collision detection. In this case, as soon as the collision detection circuit 63 detects the presence of a high ENERG signal 68 and interprets it as a (false) collision, it generates a high COLL signal 80 to force the operation of the transceiver 15 back to the IDLE state 96 of the NORMAL PHASE.

As a consequence, repeated attempts of the controller 17 to initiate a transmission will cause the control circuit 25 to force the operation of the transceiver 15 back and forth between the IDLE state 96 and the NORMAL MODE A state 98 of the NORMAL PHASE. No adjustment of the adaptive hybrid 23 will occur to correct the misadjustment of the adaptive hybrid 23, so the adaptive hybrid 23 will remain misadjusted. This operation results in a false collision detect deadlock situation from which the adaptive hybrid 23 cannot recover.

To prevent such a false collision detect deadlock situation, the false collision detection circuit 71 counts the number of consecutive collisions generated by the collision detection circuit 63. If a number of consecutive transmissions has resulted in consecutive collisions, it is highly probable that at least one of the above-identified events has caused the deadlock problem. In such a case, if an exemplary eight consecutive collisions have occurred, the false collision detection circuit 71 generates an 8 COLL signal (FIG. 4). This 8 COLL signal is used by the training mode circuit 61 (FIG. 4) as a RESET signal 62 (FIG. 5) to return the operation of the control circuit 25 to the IDLE state 86 of the TRAINING PHASE. It will be recalled that in the TRAINING MODE 90, the low COLLDIS/ signal 74 disables the collision detection circuit 63 during the 128 bit long TRAINING MODE 90, and the adaptive hybrid 23 is adaptively controlled by the high ADJEN signal 82 to readjust itself for crosstalk cancellation. Since no false collisions may occur during the TRAINING MODE 90, the false collision detect deadlock problem is resolved.

The specific circuits in the control circuit 25 of FIG. 4 will now be discussed in detail by referring to FIGS. 7-10. To help explain the operation of each of these FIGS. 7-10, reference will also be made to the waveforms of FIG. 5.

Figure 7:
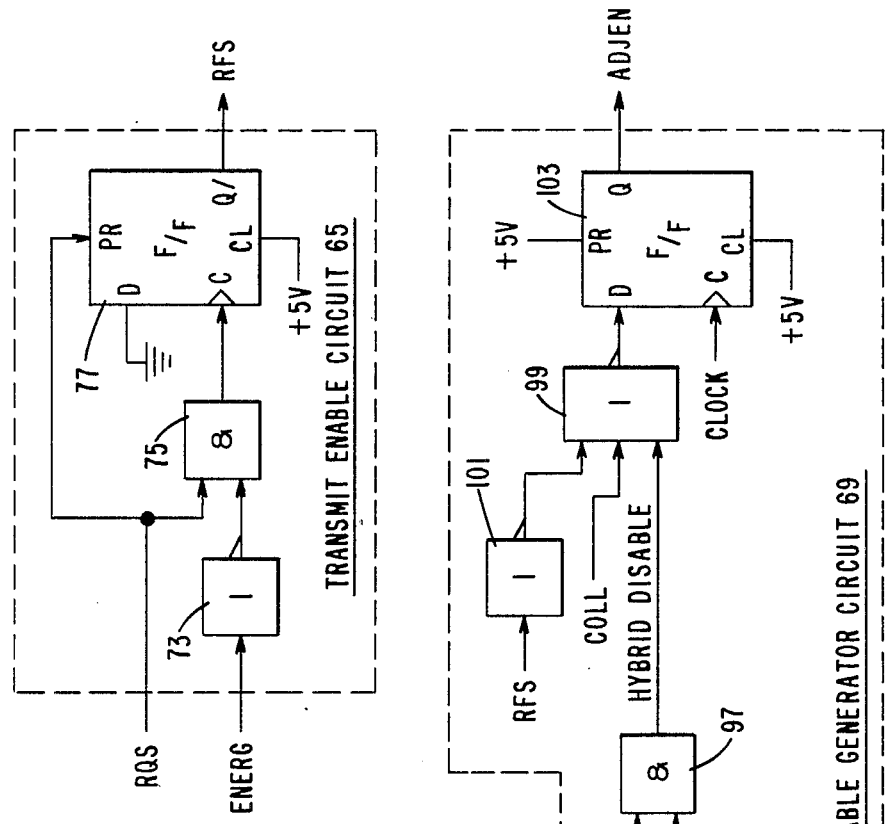
FIG. 7 is a schematic block diagram of the transmit enable circuit of the control circuit of FIG. 4.

Referring now to FIG. 7, a schematic block diagram of the transmit enable circuit 65 of FIG. 4 is illustrated. The ENERG signal 68 is applied by way of an inverter 73 to a first input of an AND gate 75 while the RQS signal 64 is applied to the second input of the AND gate 75. The output of AND gate 75 is applied to the clock input (C) of a flip-flop 77.

Figure 9:
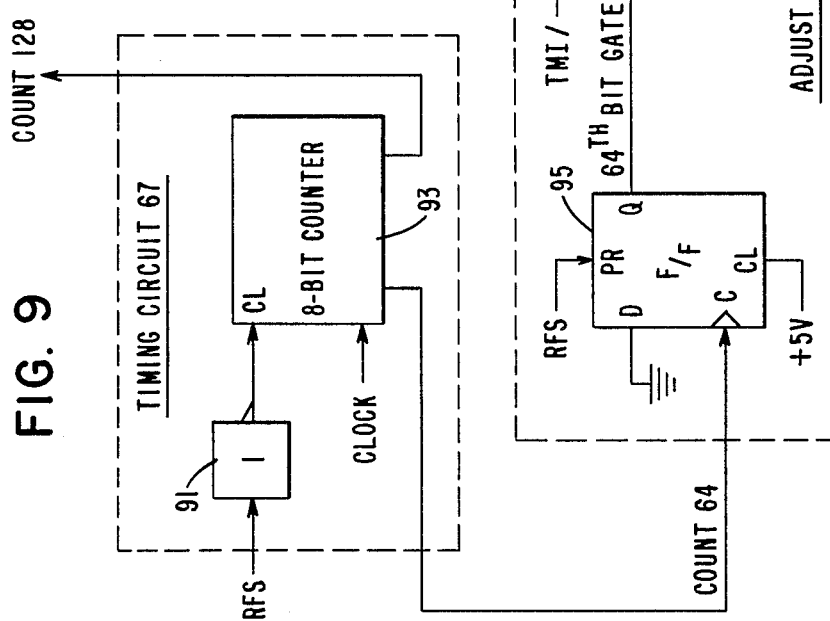
FIG. 9 is a schematic block diagram of the timing circuit and adjust enable generator circuit of the control circuit of FIG. 4.
Figure 8:
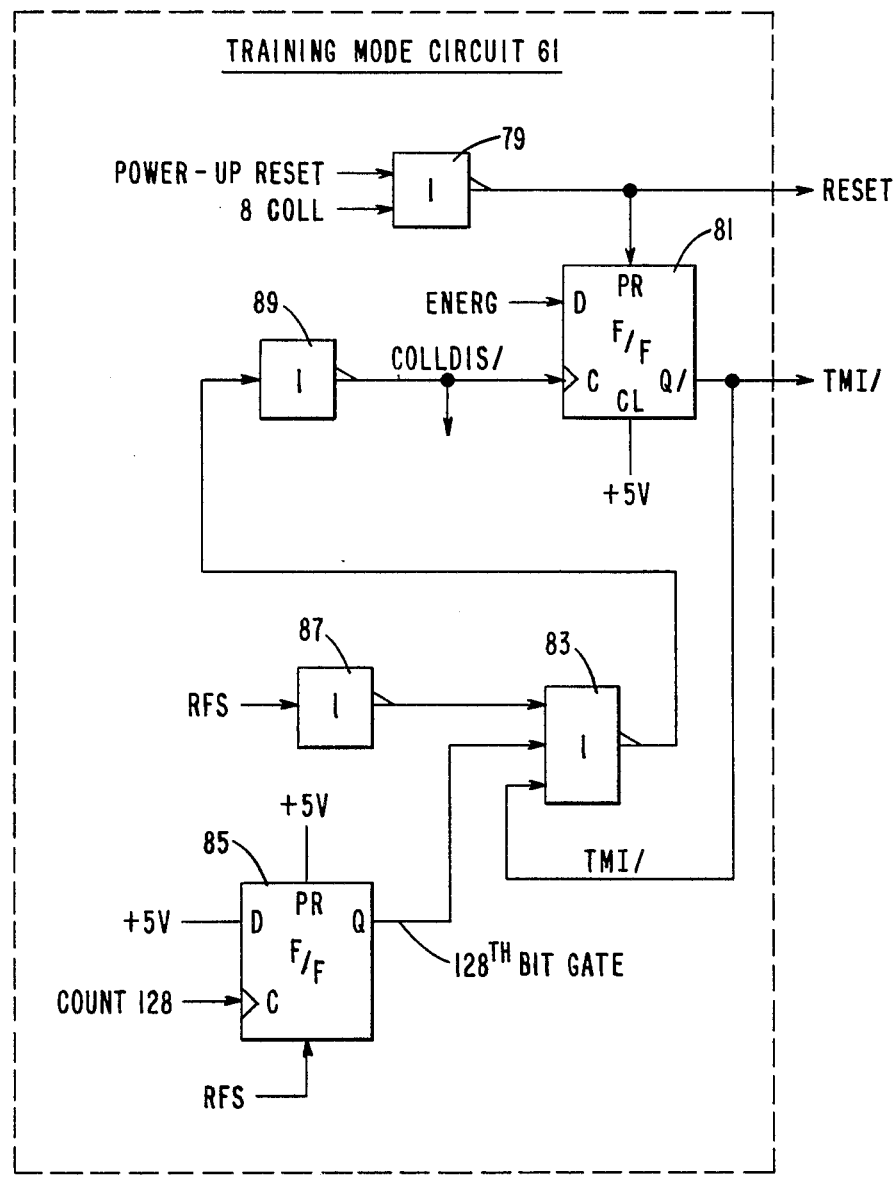
FIG. 8 is a schematic block diagram of the training mode circuit of the control circuit of FIG. 4.
Figure 10:
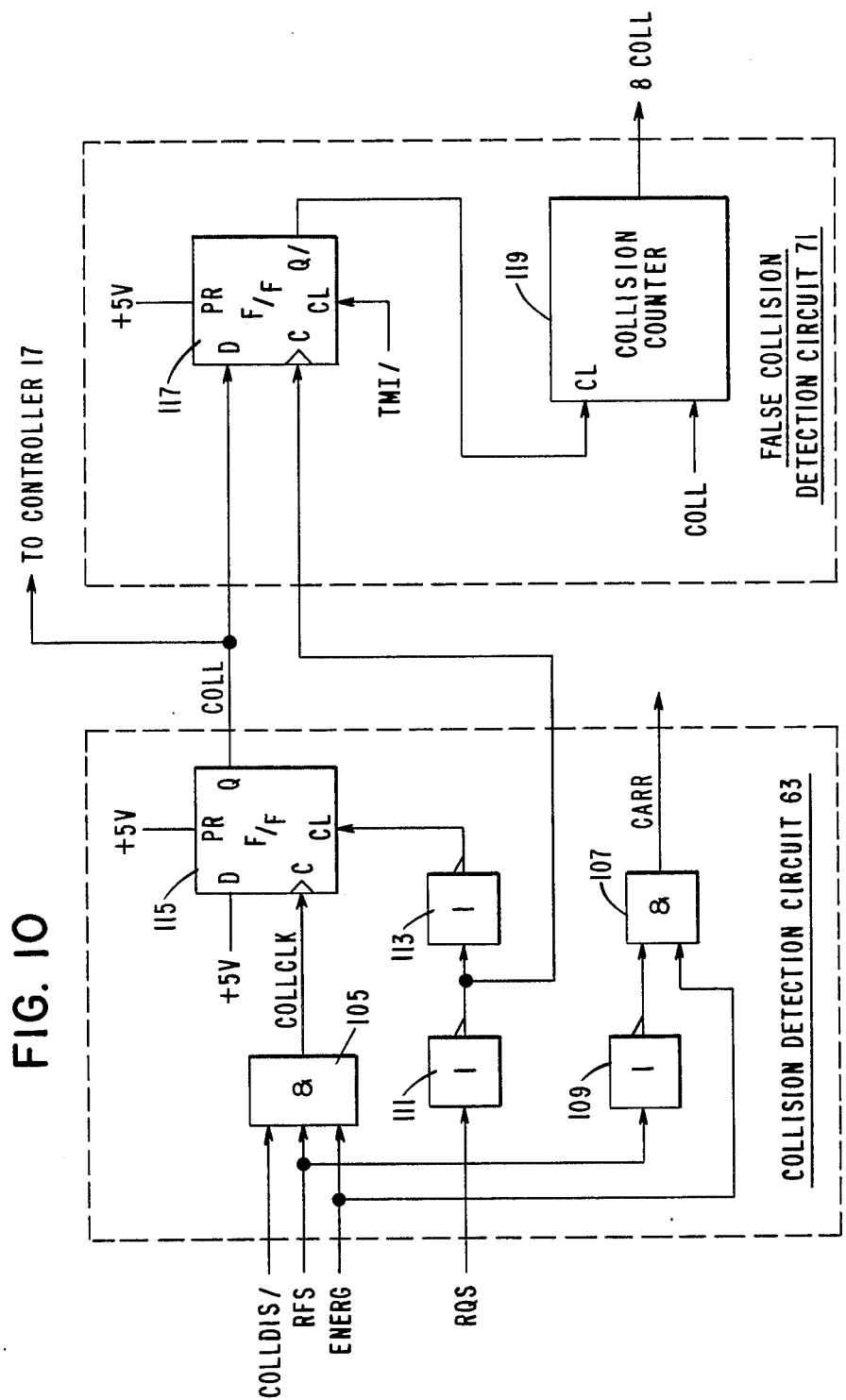
FIG. 10 is a schematic block diagram of the collision detection circuit and false collision detection circuit of the control circuit of FIG. 4.

It should be noted at this time that the flip-flop 77, as well as all of the other flip-flops in FIGS. 8, 9 and 10, are dual D-type flip-flops having preset (PR) and clear (CL) inputs. Each of these flip-flops may be manufactured by Texas Instruments, Incorporated, Dallas, Tex., with part number SN74LS74A. Each of these flip-flops operates according to the following function table:

| FUNCTION TABLE | | | | | |
|---|---|---|---|---|---|
| INPUTS | | | | OUTPUTS | |
| PR | CL | C | D | Q | Q/ |
| L | H | X | X | H | L |
| H | L | X | X | L | H |
| H | H | ↑ | H | H | L |
| H | H | ↑ | L | L | H |
| H | H | L | X | Q₀ | Q₀/ | where:
PR = the preset input
CL = the clear input
C = the clock input
D = the D input
Q = the Q output
Q/ = the Q/ output
X = don't care
L = low
H = high
↑ = the rising edge of the signal used as a clock
Q₀ = the state of the Q output on the previous clock
Q₀/ = the state of the Q/ output on the previous clock When RQS 64 is low, RFS 66 is low. When ENERG 68 is low and RQS 64 goes high, AND gate 75 applies a rising signal to the clock input of flip-flop 77, causing the flip-flop 77 to develop a high RFS signal to initiate a transmission. On the other hand, when ENERG 68 is high, AND gate 75 is disabled to prevent a high RQS signal from clocking the flip-flop 77. As a result, no high RFS signal can be developed by the circuit 65 when ENERG 68 is high.

FIG. 8 illustrates a schematic block diagram of the training mode circuit 61 of the control circuit 25 of FIG. 4. There are three operational states in the operation of the training mode circuit 61; namely, the IDLE state (FIG. 5) after RESET, the TRAINING MODE (FIG. 5) and the operation of the circuit 61 after the TRAINING MODE (FIG. 5).

IDLE STATE AFTER RESET

Upon the application of either a power-up reset from the controller 17 or the 8 COLL signal from the false collision detection circuit 71 to a NOR gate 79 at time t₀, a low RESET signal 62 is applied from the gate 79 to the PR input of a flip-flop 81. This RESET signal 62 causes the flip-flop 81 to develop a low TMI/ signal 76 at its Q/ output. This low TMI/ signal 76 is applied to a first input of a NOR gate 83. At this time, a low RFS signal 66 clears a flip-flop 85 to develop a low Q output. This low output from the flip-flop 85 is applied to a second input of the NOR gate 83. The low RFS signal 66 is inverted by a logical inverter 87 before being applied to a third input of the NOR gate 83. Since the logical inversion of RFS is a high signal, the NOR gate 83 develops a low signal which is logically inverted by an inverter 89 in order to develop a high COLLDIS/ signal at the output of inverter 89 at time t₀. Throughout this IDLE state (from time t₀ to time t₁), COLLDIS/ 74 is high and TMI/ is low.

TRAINING MODE

At time t₁, RFS 66 goes high. The inversion of this high RFS signal 66 causes all three inputs to NOR gate 83 to be low. As a result, NOR gate 83 develops a high output which is inverted by inverter 89 to produce a low COLLDIS/ signal 74 to disable the collision detection circuit 63. During this TRAINING MODE (between time t₁ and time t₃), both COLLDIS/ 74 and TMI/ 76 remain low.

AFTER TRAINING MODE

It should be noted that the ENERG signal 68 is applied to the D input of the flip-flop 81. At time t₃ (which is 128 bit times after RFS 66 went high at time t₁), a rising COUNT 128 signal from timing circuit 67 (FIG. 4) clocks flip-flop 85, causing the flip-flop 85 to develop a high 128th BIT GATE signal 72 at its Q output. The high 128th BIT GATE signal 72, which is applied to the second input of NOR gate 83, causes the gate 83 to develop a low output which is inverted by inverter 89 to produce a high COLLDIS/ signal 74 to enable the collision detection circuit 63. The rising edge of the COLLDIS/ signal 74 also clocks the flip-flop 81. If the ENERG signal 68 is low at this time, the rising edge of COLLDIS/ 74 causes the flip-flop 81 to change its output states. As a result, the flip-flop 81 causes TMI/ 76 to go high to terminate the TRAINING MODE. From time t₃ until another RESET 62 is generated by either a power-up reset or an 8 COLL signal, both COLLDIS/ 74 and TMI/ 76 remain high. However, it should be noted that if ENERG 68 is high at the time of the rising edge of the COLLDIS/ signal 74, the flip-flop 81 does not change states, but rather continues to output a low TMI/ signal 76. The state of the transceiver 15 at this time is the TRAINING MODE COLL state 92 (FIG. 6).

Referring now to FIG. 9, a schematic block diagram of the timing circuit 67 and adjust enable generator circuit 69 of the control circuit 25 of FIG. 4 is illustrated.

TIMING CIRCUIT 67

A low RFS signal 66 is logically inverted by an inverter 91 to apply a high signal to the clear input of an exemplary 8-bit counter 93. This 8-bit counter 93 may be implemented by means of two 4-bit counters manufactured by Texas Instruments, Incorporated, Dallas, Tex., each having part number SN74LS393. The high signal at the clear input of counter 93 keeps the counter 93 cleared to a 0 COUNT. When RFS 66 goes high (e.g., at time $t_1$, $t_5$ or $t_8$), the counter 93 is enabled to start counting clocks from the clock generator 60 (FIG. 3). After counting 64 clocks (equivalent to 64 bit times), the counter 93 generates a COUNT 64 signal. Similarly, after the count of the counter 93 reaches 128, the counter 93 develops a COUNT 128 signal (128 bit times after RFS 66 goes high). At the end of a transmission, RFS 66 goes low and its logical inversion by inverter 91 once again keeps the counter 93 cleared to a 0 COUNT, until RFS 66 goes high again.

ADJUST ENABLE GENERATOR CIRCUIT 69

There are five operational states in the operation of the adjust enable generator circuit 69. These five operational states are the TRAINING MODE (FIG. 5), TRAINING MODE COLL 92 (FIG. 6), the FIRST NORMAL MODE (after the TRAINING MODE) (FIG. 5), an IDLE STATE (FIG. 5) and a SUBSEQUENT NORMAL MODE (FIG. 5).

TRAINING MODE

Before the TRAINING MODE, the RFS signal 66 is low. A low RFS 66 presets a flip-flop 95 to develop a high 64th BIT GATE signal 70 at its Q output (e.g., at time $t_0$). When RFS 66 goes high at time $t_1$ to start the TRAINING MODE, the 64th BIT GATE signal 70 remains high and TMI/ 76 remains low (since the RESET signal 62 at time $t_0$ preset the flip-flop 81 in FIG. 8 to develop a low TMI/ 76 at that time). Both TMI/ 76 and the 64th BIT GATE signal 70 are applied to inputs of an AND gate 97. Since TMI/ 76 is low, AND gate 97 develops a low (inactive) hybrid disable signal 78 which is applied to a first input of a NOR gate 99. The COLL signal 80 is applied to a second input of the NOR gate 99.

It should be recalled that the COLL signal 80 is low during the TRAINING MODE (since the collision detection circuit 63 is disabled by a low COLLDIS/ signal 74 during the TRAINING MODE). The high RFS signal during the TRAINING MODE is logically inverted by an inverter 101 before being applied to a third input of the NOR gate 99. Since all three inputs to NOR gate 99 are low during the TRAINING MODE (between times $t_1$ and $t_3$), the NOR gate develops and applies a high signal to the D input of a flip-flop 103 during the entire TRAINING MODE. This high signal on the D input of flip-flop 103 is clocked to the Q output of the flip flop 103 as the high ADJEN signal 82. Thus, during the TRAINING MODE, the hybrid disable signal 78 is low (inactive) and a high ADJEN signal 82 enables the adaptive hybrid 23 to adjust itself to cancel crosstalk from the transmitter 19 to the receiver 21.

TRAINING MODE COLL (after the TRAINING MODE)

If after the 128 bit times in the TRAINING MODE the ENERG signal 68 is high, TMI/ 76 remains low and COLL 80 goes high. Since COLL 80 goes high, NOR gate 99 (FIG. 9) develops and applies a low signal to the D-input of flip flop 103 (FIG. 9). This low signal on the D-input of flip flop 103 is clocked to the Q output of flip flop 103 as a low ADJEN signal 82. Thus, during TRAINING MODE COLL a low ADJEN signal 82 disables the adaptive hybrid 23 (FIG. 3), preventing the adaptive hybrid 23 from adjusting itself to cancel crosstalk from the transmitter 19 (FIG. 3) to the receiver 21 (FIG. 3). During the TRAINING MODE COLL state, the high COLL signal 80 causes the controller 17 to prematurely terminate the high RQS signal 64. This will cause the control circuit 25 to force the transceiver 15 to change from the TRAINING MODE COLL state 92 (FIG. 6) to the IDLE state 86 (FIG. 6) of the TRAINING PHASE.

FIRST NORMAL MODE (after the TRAINING MODE)

If after the 128 bit times in the TRAINING MODE the ENERG signal 68 is low, TMI/ 76 goes high to terminate the TRAINING PHASE at time $t_3$ and begin the first NORMAL MODE after the TRAINING MODE. However, since the 64th bit gate 70 went low at time $t_2$, the AND gate 97 continues to develop a low hybrid disable signal 78 during this first NORMAL MODE (between times $t_3$ and $t_4$). If no high COLL signal 80 is generated during this first NORMAL MODE, both COLL 80 and the inversion of RFS 66 remain low along with the low hybrid disable 78. Thus, a high ADJEN signal 82 continues to be developed during this first NORMAL MODE. However, if a high COLL signal 80 is generated during this FIRST NORMAL MODE, the output of NOR gate 99 will immediately go low, and the flip-flop 103 will terminate the high ADJEN signal 82 on the rising edge of the next clock.

IDLE STATE

At the end of the transmission at time $t_4$, the controller causes RQS 64 to go low, which, in turn, causes RFS 66 to go low to terminate the transmission. At this time ($t_4$), the control circuit 25 forces the transceiver 15 to go into an IDLE STATE (between times $t_4$ and $t_5$). When RFS 66 goes low at time $t_4$, the flip-flop 95 is preset to develop a high 64th BIT GATE during this IDLE STATE. Since TMI/ 76 had previously gone high at time $t_3$, both inputs to AND gate 97 are high. Therefore, AND gate 97 will develop a high HYBRID DISABLE signal 78 to disable the adaptive hybrid 23 during this IDLE STATE. This high HYBRID DISABLE signal 78 will cause the NOR gate 99 to apply a low signal to the D input of flip-flop 103, which low signal will be clocked out of the flip-flop as a low ADJEN signal 82 to disable the adaptive hybrid 23. Thus, during this IDLE STATE, the HYBRID DISABLE signal 78 will be high and the ADJEN signal 82 will be low.

SUBSEQUENT NORMAL MODE

The generation of a high RQS signal 64 by the controller 17 will cause RFS 66 to go high to start a transmission in a SUBSEQUENT NORMAL MODE, provided that no collision is detected. After RFS 66 goes high, the flip-flop 95 will still continue to develop a high 64th BIT GATE 70. Since both TMI/ 76 and the 64th BIT GATE 70 remain high after the high RFS 66 is generated, AND gate 97 will continue to develop an active or high HYBRID DISABLE signal 78 which will be passed through NOR gate 99 as a low signal to cause the flip-flop 103 to still develop a low ADJEN signal 82 to disable the adjustment of the adaptive hybrid 23.

Upon receiving the rising edge of the COUNT 64 signal from the counter 93 at its clock input, the flip-flop 95 changes its output states. So, the 64 BIT GATE 70 at the Q output of the flip-flop 95 goes low to disable the AND gate 97 and cause the HYBRID DISABLE signal 78 to go low after 64 bits of transmission in this SUBSEQUENT NORMAL MODE. If no high COLL signal is generated during this SUBSEQUENT NORMAL MODE, both COLL 80 and the inversion of RFS 66 remain low along with the now low hybrid disable 78. Since all of the inputs to NOR gate 99 are low, NOR gate 99 will develop a high output which will be clocked out of the flip-flop 103 as a high ADJEN signal 82 to enable the adaptive hybrid 23 to adjust itself after the first 64 bits of the transmission in this SUBSEQUENT NORMAL MODE. In this manner, the flip-flop 95 and AND gate 97 cooperate to prevent a collision during the first 64 bits of a transmission during the SUBSEQUENT NORMAL MODE from causing a misadjustment of the adaptive hybrid 23.

If a high COLL signal 80 is generated after the first 64 bits of such a transmission, the NOR gate 99 will immediately develop a low signal which will be clocked out of the flip-flop 103 as a low ADJEN signal 82 to disable the adjustment of the adaptive hybrid 23 at that time.

Referring now to FIG. 10, a schematic diagram of the collision detection circuit 63 and false collision detection circuit 71 of the control circuit 25 of FIG. 4 is illustrated.

COLLISION DETECTION CIRCUIT 63

In the collision detection circuit 63, the COLLDIS/ signal 74, the RFS signal 66 and the ENERG signal 68 are all applied as inputs to an AND gate 105. The ENERG signal 68 is also directly applied to one input of an AND gate 107, whereas the RFS 66 is inverted by an inverter 109 before being applied to a second input of the AND gate 107.

Before a transmission is initiated, both RQS 64 and RFS 66 are low. A low RQS signal 64 is suitably delayed by being passed through two cascaded logical inverters 111 and 113 before being utilized to clear a flip-flop 115 to develop a low COLL signal 80 at that time. When RFS 66 is low and ENERG 68 is high, both inputs to the AND gate 107 are high. This enables AND gate 107 to develop and apply a carrier (CARR) signal to the controller 17 to indicate that a carrier signal has been detected.

It will be recalled that a low COLLDIS/ signal 74 is generated by the training mode circuit 61 (FIG. 8) during the TRAINING MODE to prevent the collision detection circuit 63 from generating a high COLL signal 80 during the TRAINING MODE. Thus, as long as a low COLLDIS/ signal is being generated, a high RFS signal 66 and a high ENERG signal 68 cannot be used to generate a high COLL signal 80. However, at the end of the TRAINING MODE, COLLDIS/ 74 goes high. Therefore, if both RFS 64 and ENERG 68 are high at this time, the AND gate 105 will develop a high COLLCLK (collision clock) which will cause the flip-flop 115 to develop a high COLL signal 80. This high COLL signal 80 will cause the controller 17 to drop RQS 64 to terminate the transmission.

FALSE COLLISION DETECTION CIRCUIT 71

Each high COLL signal 80 is also applied to the D input of a flip-flop 117. During the TRAINING MODE, the low TMI/ signal 76 causes the flip-flop 117 to apply a high Q/ output to the clear (CL) input of a collision counter 119 to reset the counter 119 to zero and keep the counter 119 from being incremented during the TRAINING MODE. The counter 115 may be a 4-bit counter manufactured by Texas Instruments, Incorporated, Dallas, Tex. with part number SN74LS393.

After the end of the TRAINING MODE, TMI/ 76 goes high and the collision detection circuit 63 is enabled by a high COLLDIS/ signal 74 to generate a high COLL signal 80 each time that a collision is detected.

Each high COLL signal 80 from the circuit 63 is applied to both the D input of the flip-flop 117 and to the controller 17. Each high COLL signal 80 causes the controller 17 to make RQS 66 go low. When RQS 64 falls, the logical inversion of RQS 64 by the inverter 111 in circuit 63 produces a rising edge which clocks the input high COLL signal 80 (FIG. 5) to the Q output of the flip-flop 117 and causes the Q/ output of the flip-flop 117 to go low or stay low. Since a high COLL signal 80 will occur before the rising edge of the RQS/ signal 64 from inverter 111, the Q/ output of flip-flop 117 will remain low during each generation of a high COLL signal 80. However, it should be realized that if no high COLL signal 80 is generated during a transmission, the Q/ output of the flip-flop 117 will go high to reset the counter 119 to a zero count.

The low Q/ output of the flip-flop 117 is applied to the clear input of the counter 119 to enable the counter 119 to count the high COLL signal 80 being applied thereto at that time. When the collision counter 115 counts eight consecutive high COLL signals 80 during eight consecutive transmissions, it generates the 8 COLL signal. As mentioned before, this 8 COLL signal is used to reset the training mode circuit 61 (FIG. 8) so that the control circuit 25 forces the transceiver 15 back into a TRAINING MODE to prevent the transceiver 15 from being locked into the false collision detect deadlock situation that was previously discussed.

The invention thus provides a control circuit for improving the operational capabilities of an adaptive hybrid circuit in a local area network by disabling the adjustment of the adaptive hybrid during an initial period of a transmission in order to prevent a misadjustment of the adaptive hybrid due to the occurrence of a collision during that initial period and by preventing a false collision detect deadlock situation by forcing the transceiver back into a training mode when a preselected number of false collisions have been detected.

While the salient features of the invention have been illustrated and described, it should be readily apparent to those skilled in the art that many changes and modifications can be made in the control circuit of the invention presented without departing from the spirit and true scope of the invention. Accordingly, the present invention should be considered as encompassing all such changes and modifications of the invention that fall within the broad scope of the invention as defined by the appended claims.

We claim:

1. In a local area network having a plurality of stations coupled to a transmission line over which signals are being simultaneously transmitted and received and wherein each station includes a station controller, a transmitter, a receiver and an adaptive hybrid circuit coupled to the transmission line and between the transmitter and the receiver for adaptively cancelling crosstalk from the transmitter to the receiver, a control circuit in each station for controlling the operation of the adaptive hybrid circuit in the station, said control circuit comprising:

means responsive to a request-to-send signal from the station controller for generating a first signal to enable a signal to be transmitted by the transmitter; and means responsive to the first signal for enabling the adaptive hybrid circuit to adaptively cancel crosstalk from the transmitter to the receiver after a preselected period of time after the start of each transmission.

2. In a local area network having a plurality of stations coupled to a transmission line over which signals are being simultaneously transmitted and received and wherein each station includes a station controller, a transmitter, a receiver and an adaptive hybrid circuit coupled to the transmission line and between the transmitter and the receiver for adaptively cancelling crosstalk from the transmitter to the receiver, a control circuit in each station for controlling the operation of the adaptive hybrid circuit in the station, said control circuit comprising:

first means responsive to a request-to-send signal from the station controller when no energy signal is being generated by the receiver for generating a first signal to enable a signal to be transmitted by the transmitter, the absence of said energy signal indicating that no signal is being received by the receiver;

second means responsive to said first signal and to either a first reset signal from the station controller or to a second reset signal for causing a training mode of operation for a preselected duration of time and being further responsive to each subsequent first signal after the end of said training mode of operation for causing a normal mode of operation for the duration of each subsequent first signal;

third means for generating an adjust enable signal during the training mode and during each normal mode when no collision signal is generated;

fourth means responsive to a subsequent first signal during a normal mode of operation for generating a collision signal each time that an energy signal is applied thereto; and fifth means for counting successive ones of said collision signals for generating said second reset signal when a preselected number of successive collisions has occurred.

3. The control circuit of claim 2 wherein said first means is responsive to the request-to-send signal and to the absence of an energy signal for generating said first signal.

4. The control circuit of claim 2 wherein said first means is responsive to the request-to-send signal from the station controller for generating said first signal, and the station controller only outputs a request-to-send signal when no energy signal is being generated by the receiver.

5. In a local area network having a plurality of stations coupled to a transmission line over which signals are being simultaneously transmitted and received and wherein each station includes a station controller, a transmitter, a receiver and an adaptive hybrid circuit coupled to the transmission line and between the transmitter and the receiver for adaptively cancelling crosstalk from the transmitter to the receiver, a control circuit in each station for controlling the operation of the adaptive hybrid circuit in the station, said control circuit comprising:

first means responsive to a request-to-send signal from the station controller when no energy signal is being generated by the receiver for generating a first signal to enable a signal to be transmitted by the transmitter, the absence of said energy signal indicating that no signal is being received by the receiver;

second means responsive to said first signal for developing first and second count signals after respective first and second preselected periods of time;

third means selectively responsive to a reset signal, said first signal and said second count signal for developing a training signal; and fourth means selectively responsive to said first signal, said training signal and said first count signal for generating an adjust enable signal during the period of a transmitted signal when said training signal is in a first logical state and during that portion of the period of each transmitted signal that follows the occurrence of said first count signal when said training signal is in a second logical state, said adjust enable signal enabling the adaptive hybrid circuit to automatically adjust itself to minimize crosstalk from the transmitter to the receiver.

6. The control circuit of claim 5 wherein said first means is responsive to the request-to-send signal and to the absence of an energy signal for generating said first signal.

7. The control circuit of claim 5 wherein said first means is responsive to the request-to-send signal from the station controller for generating said first signal, and the station controller only outputs a request-to-send signal when no energy signal is being generated by the receiver.

8. The control circuit of claim 5 wherein said third means includes means responsive to a second reset signal from the station controller or to a third reset signal for generating said reset signal and said third means further generates a collision disable signal during said second preselected period of time whenever said training signal is in a first logical state; and said fourth means is further responsive to a collision signal for terminating any adjust enable signal being generated; and wherein said control circuit further includes:

fifth means responsive to said first signal and to the absence of said collision disable signal for generating said collision signal each time that said energy signal is applied thereto; and sixth means for counting successive ones of said collision signals for generating said third reset signal when a preselected number of successive collisions has occurred.

9. The control circuit of claim 5 wherein said third means includes means responsive to a second reset signal from the station controller or to a third reset signal for generating said reset signal and said third means further generates a collision disable signal during said second preselected period of time whenever said training signal is in a first logical state; and said fourth means is further responsive to a collision signal for terminating any adjust enable signal being generated; and wherein said control circuit further includes:

fifth means selectively responsive to said first signal and to the absence of said collision disable signal for generating said third reset signal when a preselected number of successive energy signals have been applied thereto.

10. The control circuit of claim 9 wherein said fifth means includes:

sixth means responsive to said first signal and to the absence of said collision disable signal for generating said collision signal each time that said energy signal is applied thereto; and seventh means for counting successive ones of said collision signals for generating said third reset signal when a preselected number of successive collisions has occurred.

11. In a local area network having a plurality of stations coupled to a transmission line over which signals are being simultaneously transmitted and received and wherein each station includes a station controller, a transmitter, a receiver and an adaptive hybrid circuit coupled to the transmission line and between the transmitter and the receiver for adaptively cancelling crosstalk from the transmitter to the receiver, a control circuit in each station for controlling the operation of the adaptive hybrid circuit in the station, said control circuit comprising:

first means responsive to a request-to-send signal from the station controller when no energy signal is being generated by the receiver for generating a first signal to enable a signal to be transmitted by the transmitter, the absence of said energy signal indicating that no signal is being received by the receiver;

second means selectively responsive to said first signal, a reset signal, and a second signal for generating a third signal;

third means selectively responsive to said first and third signals for generating a hybrid disable signal for a first preselected period of time at the beginning of each transmitted signal that occurs during the absence of said third signal and for further generating said second signal after a second preselected period of time; and fourth means selectively responsive to said first signal and to the absence of said hybrid disable signal for generating an adjust enable signal to enable the adaptive hybrid circuit to automatically adjust itself to minimize crosstalk from the transmitter to the receiver.

12. The control circuit of claim 11 wherein said first means is responsive to the request-to-send signal and to the absence of an energy signal for generating said first signal.

13. The control circuit of claim 12 wherein said first means is responsive to the request-to-send signal from the station controller for generating said first signal, and the station controller only outputs a request-to-send signal when no energy signal is being generated by the receiver.

14. The control circuit of claim 11 wherein said second means includes fifth means responsive to a second reset signal from the station controller or to a third reset signal for generating said reset signal, and said second means further generates a collision disable signal during said second preselected period of time after said first signal is generated; and said fourth means is further responsive to a collision signal for terminating any said adjust enable signal being generated; and wherein said control circuit further includes:

sixth means responsive to said first signal and to the absence of said collision disable signal for generating said collision signal each time that said energy signal is applied thereto; and seventh means responsive to said collision signal and to the absence of said third signal for generating said third reset signal when a preselected number of successive collisions has occurred.

15. In a local area network having a plurality of stations coupled to a transmission line over which signals are being simultaneously transmitted and received and wherein each station includes a station controller, a transmitter, a receiver and an adaptive hybrid circuit coupled to the transmission line and between the transmitter and the receiver for adaptively cancelling crosstalk from the transmitter to the receiver, a control circuit in each station for controlling the operation of the adaptive hybrid circuit in the station, said control circuit comprising:

first means being responsive to the absence of an energy signal indicating that no signal is being received by the receiver and being further responsive to a request-to-send signal from the station controller for generating a first signal to enable a signal to be transmitted by the transmitter;

second means selectively responsive to said first signal, a second signal, said energy signal, and either a first reset signal from the station controller or a second reset signal for generating a collision disable signal during a first preselected period of time after said first signal is generated and for further generating a third signal during a training mode of operation;

third means selectively responsive to said first and third signals for generating a hybrid disable signal for a second preselected period of time at the beginning of each transmitted signal that occurs during the absence of said third signal and for further generating said second signal after said first preselected period of time;

fourth means responsive to said first signal and to the absences of said hybrid disable signal and a collision signal for generating an adjust enable signal to enable the adaptive hybrid circuit to automatically adjust itself to minimize crosstalk from the transmitter to the receiver;

fifth means responsive to said first signal and to the absence of said collision disable signal for generating said collision signal each time that said energy signal is applied thereto; and sixth means responsive to said collision signal and to the absence of said third signal for generating said second reset signal when a preselected number of successive collisions has occurred.

* * * * *